(12) United States Patent
Srivastava et al.

(10) Patent No.: US 12,367,761 B2
(45) Date of Patent: Jul. 22, 2025

(54) DRIVER SCORING SYSTEM AND METHOD WITH ACCIDENT PRONENESS FILTERING USING ALERT CLUSTERING AND SAFETY-WARNING BASED ROAD CLASSIFICATION

(71) Applicant: Intel Corporation, Santa Clara, CA (US)

(72) Inventors: Mashrin Srivastava, Maharashtra (IN); Muvazima Mansoor, Bengaluru (IN); Sean J. Lawrence, Bangalore Ka (IN); Subramanian C, Bengaluru (IN); Balachandar Santhanam, Bangalore Ka (IN)

(73) Assignee: Intel Corporation, Santa Clara, CA (US)

( * ) Notice: Subject to any disclaimer, the term of this patent is extended or adjusted under 35 U.S.C. 154(b) by 790 days.

(21) Appl. No.: 17/484,178

(22) Filed: Sep. 24, 2021

(65) Prior Publication Data

US 2022/0013006 A1 Jan. 13, 2022

(51) Int. Cl.
| | | |
|---|---|---|
| *G06F 16/21* | (2019.01) | |
| *G06F 16/215* | (2019.01) | |
| *G06F 16/28* | (2019.01) | |
| *G06F 16/29* | (2019.01) | |
| *G06Q 50/26* | (2012.01) | |
| *G08G 1/01* | (2006.01) | |

(52) U.S. Cl.
CPC ......... *G08G 1/0141* (2013.01); *G06F 16/215* (2019.01); *G06F 16/285* (2019.01); *G06F 16/29* (2019.01); *G06Q 50/265* (2013.01); *G08G 1/0112* (2013.01)

(58) Field of Classification Search
CPC .. G08G 1/0141; G08G 1/0112; G06F 16/215; G06F 16/285; G06F 16/29; G06Q 50/265; G06Q 10/00; B60W 40/09
See application file for complete search history.

(56) References Cited

U.S. PATENT DOCUMENTS

| | | | |
|---|---|---|---|
| 10,830,605 B1 * | 11/2020 | Chintakindi | ....... G01C 21/3484 |
| 2018/0126901 A1 * | 5/2018 | Levkova | ............... B60W 40/09 |
| 2021/0166323 A1 | 6/2021 | Fields et al. | |

OTHER PUBLICATIONS

W.L. Hamilton, R. Ying, and J. Leskovec; "Inductive Representation Learning on Large Graphs," 31st Conference on Neural Information Processing Systems (NIPS 2017), arXiv:1706.02216 [cs.SI], 2017.

(Continued)

*Primary Examiner* — Apu M Mofiz
*Assistant Examiner* — Cindy Nguyen
(74) *Attorney, Agent, or Firm* — Banner & Witcoff Ltd.

(57) ABSTRACT

Techniques are disclosed to determine driver scoring that consider road accident proneness scores in driver score computations. The road accident proneness scores may be based on one or more alerts. Further, road types of roads may be determined based on alerts. The determination of the road type may use a machine learning model. In contrast to the conventional approaches, the use of road accident proneness scores in the computation of driver scores allows for the consideration of accident proneness of the road to improve upon conventional scoring techniques. Further, map data and generated maps may be improved based on determined road types.

17 Claims, 12 Drawing Sheets

(56) References Cited

OTHER PUBLICATIONS

Mobileye—Road Experience Management, 2016, https://www.mobileye.com/our-technology/rem/.

Wikipedia—"Collision Avoidance System," Dec. 10, 2020; https://en.wikipedia.org/wiki/Collision_avoidance_system.

Slavkovikj, Viktor, et al. "Image-based road type classification," 22nd International Conference on Pattern Recognition. IEEE, 2014.

F. G. Bermudez, R. C. Julian, D. W. Haldane, p. Abbeel, and R. S. Fearing, "Performance analysis and terrain classification for a legged robot over rough terrain." in IROS. IEEE, 2012, pp. 513-519.

C. Weiss, H. Frhlich, and A. Zell, "Vibration-based terrain classification using support vector machines." in IROS. IEEE, 2006, pp. 4429-4434.

C. C. Ward and K. Iagnemma, "Speed-independent vibration-based terrain classification for passenger vehicles," Vehicle System Dynamics, vol. 47, No. 9, pp. 1095-1113, 2009.

Mobileye 8 Connect, 2018, https://www.mobileye.com/uk/fleets/products/mobileye-8-connect/.

Wikipedia—"on-board diagnostics," Sep. 2, 2020, https://en.wikipedia.org/wiki/On-board_diagnostics.

Topodot, "What Are the Advantages and Disadvantages of Remote Sensing," Feb. 21, 2020, https://new.certainty3d.com/blog/what-are-the-advantages-and-disadvantages-of-remote-sensing/.

The Hindu, "Missing lane markings, signage at busy junctions leave motorists confused," Aug. 22, 2016, https://www.thehindu.com/news/cities/bangalore/Missing-lane-markings-signage-at-busy-junctions-leave-motorists-confused/article14583332.ece.

Alexandria Sage; Reuters; "Where's the lane? Self-driving cars confused by shabby U.S. roadways," Mar. 31, 2016; https://www.reuters.com/article/us-autos-autonomous-infrastructure-insig-idUSKCN0WX131.

Youtube, "Daily life in India—Driving in traffic in Delhi (India)," Dec. 29, 2014; https://www.youtube.com/watch?v=mDLCd70iTeE.

Toyota—Driver Scoring, before Jul. 2021, http://toyota.custhelp.com/app/answers/detail/a_id/10536/~/what-is-driver-score%3F%23:~:text=Driver%20Score%20uses%20the%20sensor,a%20scale%20of%200-100.

HDBSCAN—Github, 2015, https://github.com/scikit-learn-contrib/hdbscan.

Sentiance—"Each use case needs its own solution: how Sentiance delivers tailored driving scores," Mar. 29, 2019; https://www.sentiance.com/2019/03/29/driving-score/.

Jan. 2, 2023 (EP) European Search Report—App. 22195623.8.

\* cited by examiner

DRIVER SCORING SYSTEM AND METHOD WITH ACCIDENT PRONENESS FILTERING USING ALERT CLUSTERING AND SAFETY-WARNING BASED ROAD CLASSIFICATION

TECHNICAL FIELD

The disclosure described herein generally relates to driving scoring systems and methods for vehicles, including systems and methods configured to determine driver scores with improved accuracy through the reduction or removal of accident proneness bias of road segments through alert clustering, and improved road type classification based on safety warning analysis.

BACKGROUND

Vehicle driver score algorithms may utilize data produced by driver behavior and events generated by the vehicle to determine a driver score. So called "smart" vehicles, which may include artificial intelligence and/or advanced driving assistance (ADAS) systems, may compute driver scores and use the computed scores for individual vehicles and fleets of vehicles (e.g. monitored by a Fleet Management Systems (FMS)) to provide insights into potential improvements and possible interventions to improve driving quality of the drivers. Conventional driver scoring techniques may utilize data produced by driver behavior and events generated by the vehicle. However, current driver scoring techniques have various drawbacks. Further, the classification of road types generally rely on lane markers and identifiable road infrastructure, which may be impaired in developing nations and from close vehicular distance and dense traffic.

BRIEF DESCRIPTION OF THE DRAWINGS/FIGURES

The accompanying drawings, which are incorporated herein and form a part of the specification, illustrate the present disclosure and, together with the description, further serve to explain the principles and to enable a person skilled in the pertinent art to make and use the techniques discussed herein.

In the drawings, like reference characters generally refer to the same parts throughout the different views. The drawings are not necessarily to scale, emphasis instead generally being placed upon illustrating the principles of the disclosure. In the following description, reference is made to the following drawings, in which.

The present disclosure will be described with reference to the accompanying drawings. The drawing in which an element first appears is typically indicated by the leftmost digit(s) in the corresponding reference number.

DETAILED DESCRIPTION

Figure 1:
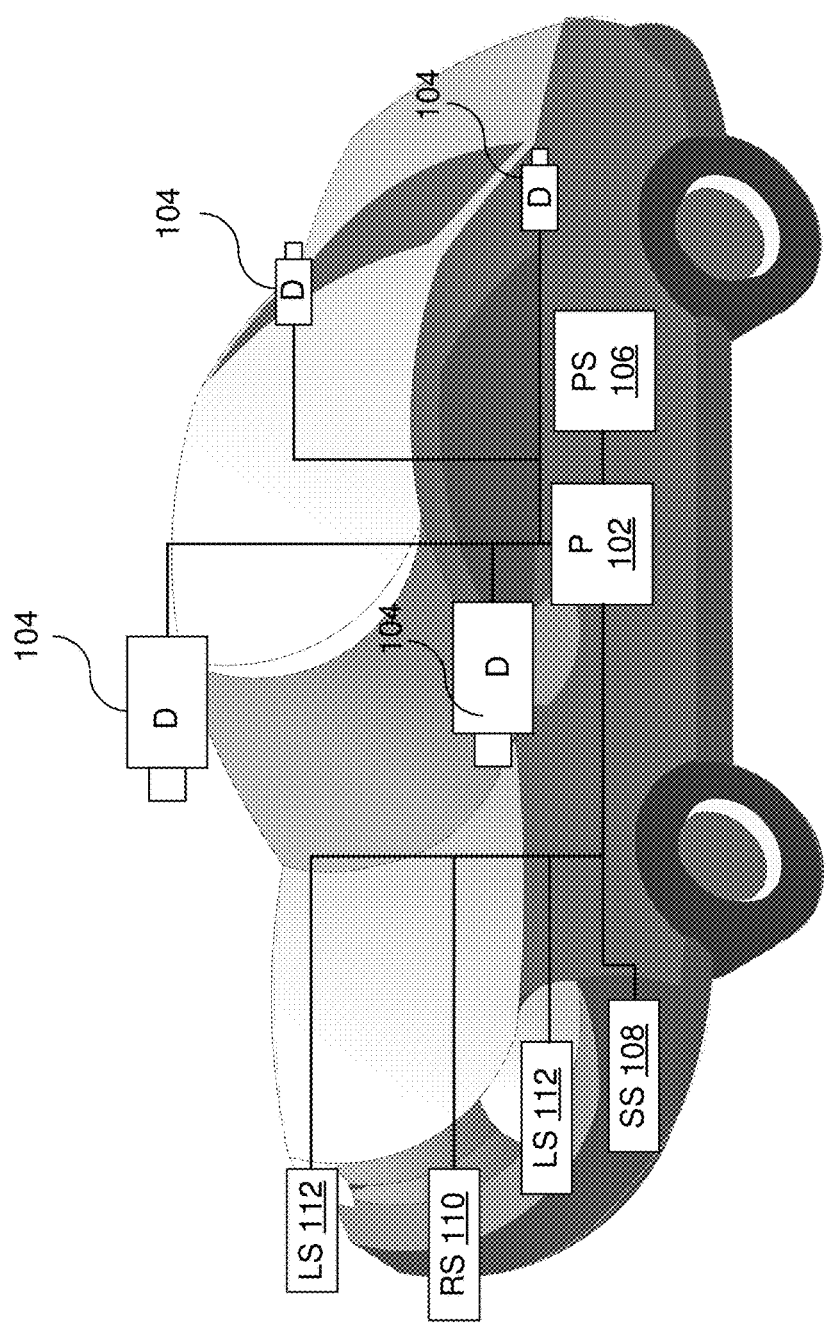
FIG. 1 illustrates a vehicle in accordance with the present disclosure.

The following detailed description refers to the accompanying drawings that show, by way of illustration, exemplary details in which the disclosure may be practiced. In the following description, numerous specific details are set forth in order to provide a thorough understanding of the present disclosure. However, it will be apparent to those skilled in the art that the various designs, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring the disclosure.

Conventional driver scoring techniques may utilize data produced by driver behavior and events generated by the vehicle. However, these conventional techniques do not account for accident proneness of a particular route (e.g. caused by road conditions) in driver score computations; and therefore, such techniques are unable to remove the bias of accident proneness variations across road infrastructures.

To address the shortcomings of conventional systems, the disclosure describes driver scoring techniques that determine a road accident proneness (RAP) score and consider the RAP score in driver score computations. In contrast to the conventional approaches described above, the use of one or more accident proneness scores to reduce or remove accident proneness bias in the computation of driver scores allows for vehicles and/or FMS to improve scoring accuracy compared to conventional scoring techniques. The respective accident proneness of routes may vary widely, due to, for example, varying construction techniques and/or materials, location, or the like, which may result in uneven surfaces, potholes, and improper designs across different roads. Further, the type of roads (e.g. paved vs. unpaved, cobblestone, brick, etc.) may also vary across localities. The accident proneness may also vary based on traffic density, varying road parameters, such as road width, grade, slope, elevation, or the like, or other factors as would be understood by one of ordinary skill in the art. In removing or reducing the bias of accident proneness in the computation of driver scores advantageously improves the accuracy of the driver scores so as to better reflect the quality of the driving.

Such driver scores provide management systems (e.g. fleet management systems) with valuable metrics that may be used to determine the quality of the drivers. The scoring and management of drivers can be used to incentivize the drivers to improve the quality of their driving as well as assist fleet managers in identifying poor driving performance and when further driving training may be needed for drivers with low driving scores. By taking into account other factors such as accident proneness of a particular road segment and/or the road quality thereof, the computation of the driver score according to the disclosure advantageously increase the accuracy of the scoring and categorization of the driver. To accurately determine the accident proneness of a road (e.g. its associated risk), the relative criticality of the different alerts raised on the road are considered. According to the disclosure, a road accident proneness (RAP) score is determined for each road segment by considering the number of alerts raised in the road segment, which may be weighted by a criticality weighting factor. The score may then normalized by dividing the score by the number of trips having passed through the segment to arrive at an average RAP score for the segment. According to the disclosure, the road segment may be determined by performing clustering processing on the total number of alerts to identify clusters of alerts. In this example, a cluster may be referred to as a segment, and vice versa. The determination of the average RAP score is then repeated for each of the clusters. A respective driver RAP score is determined for each cluster in which the driver has traversed. The driver RAP score for each traversed cluster and the corresponding average RAP score for those clusters are then used to determine the overall driver score.

One or more alerts/events may be generated from the Fleet Management Systems (FMS), Collision Avoidance Systems (CAS), Driver Monitoring Systems (DMS), or other monitoring system as would be understood by one of ordinary skill in the art. For example, alerts may be generated from Driver Monitoring Systems (DMS) that detect driver behavioral events, such as distracted-driver events, impaired-driver events, phone usage, smoking, and drowsiness. Collision Avoidance System (CAS) alerts may include, for example, as Forward Collision Warnings (FCW), Pedestrian Collision Warnings (PCW), Headway Monitoring Warnings (HWM), Lane Departure Warning (LDW), and/or other CAS alerts/events as would be understood by one of ordinary skill in the art. Driver behavior and/or vehicle alerts/events may include harsh movements (such as acceleration and/or velocity changes, braking, and directional changes), idling alerts (vehicle is halted but engine is running), free-run alerts (vehicle is moving but not in gear), or other alerts/events as would be understood by one of ordinary skill in the art. Harsh movements may also be referred to as harsh driving events, and may include: Harsh Acceleration (HA), Harsh Velocity (HV), Harsh Braking (HB), Harsh Curving (HC)/directional-change, or other harsh, sudden, or drastic vehicle maneuvers. The types of alerts/events are not limited hereto and may include any alerts/events that would be understood by one of ordinary skill in the art.

Figure 2:
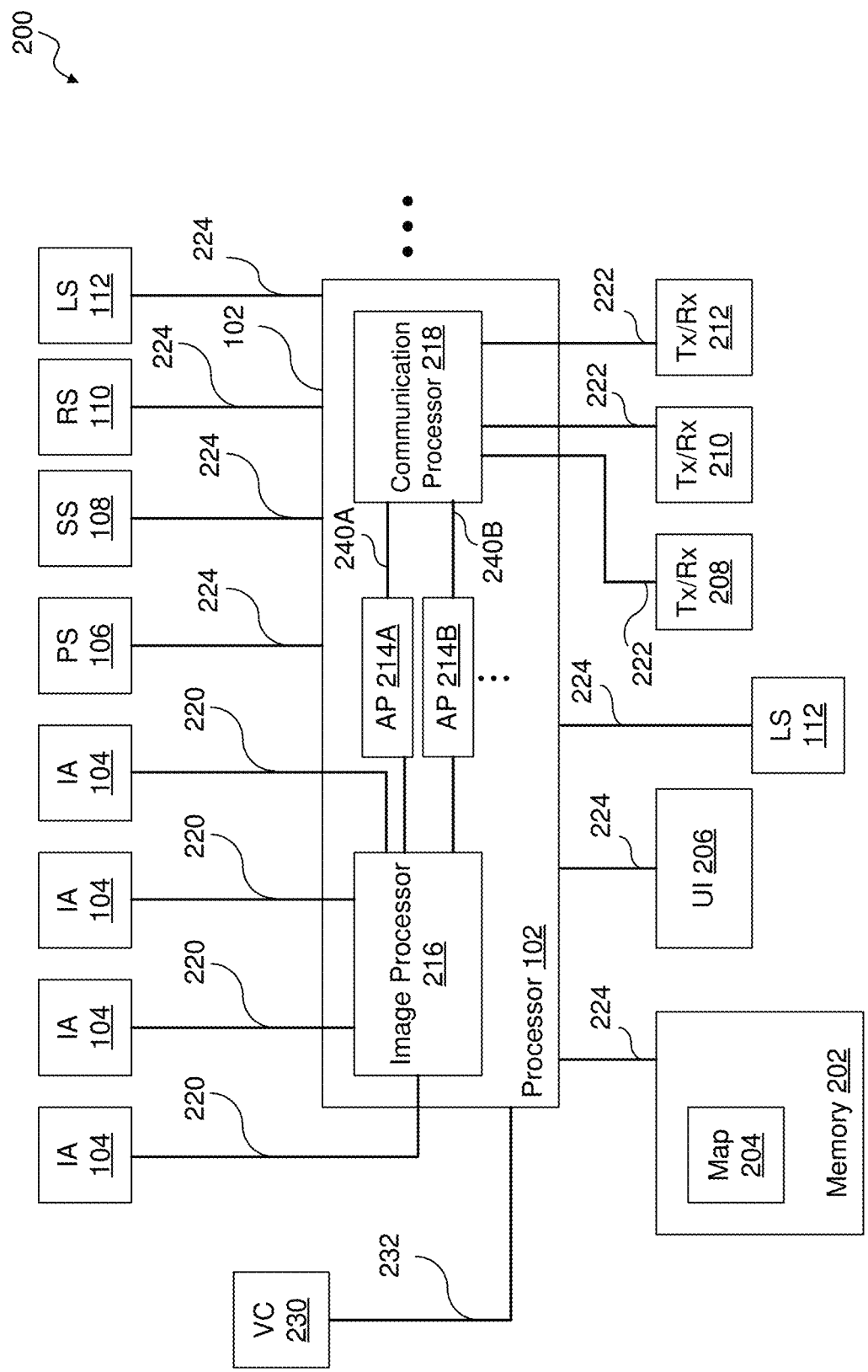
FIG. 2 illustrates various electronic components of a safety system of a vehicle in accordance with the present disclosure.

Forward Collision Warnings (FCW) include an alert before a possible low-speed collision with the vehicle in the front of the vehicle. FCWs may be generated based on, for example, sensor data from one or more sensors of the vehicle 100 (e.g. image acquisition devices 104, radar sensors 110, LIDAR sensors 112 as shown in FIGS. 1-2).

Headway Monitoring Warnings (HMW) include alerts (e.g. visual and/or audio alerts) if a distance to another vehicle in front of the vehicle is below a distance threshold (which may depend on the current speed of the vehicle. The HMWs assist the driver in maintaining a safe following distance from the vehicle ahead of them by providing alerts if the distance becomes unsafe (e.g. too short of distance).

Pedestrian and Cyclist Detection and Collision Warning (PCW) include alerts if a pedestrian or cyclist is within a zone in which a possible or imminent collision with a pedestrian or cyclist may occur.

Lane Departure Warning (LDW) may include alerts for left and right departures or possible departures from the current lane of travel.

The vehicle or fleet of vehicles may implement a Safety Driving Model (SDM). The SDM functions to provide a mathematical framework that aims to ensure safety assurance of autonomous vehicles (AVs) and/or any suitable type of vehicle that implements at least some form of an autonomously-executed action or control without human assistance (fully-autonomous control functions, semi-autonomous control functions, etc.). Thus, the SDM is a comprehensive framework that was developed to ensure both longitudinal and lateral safety of vehicles (such as AVs) in various types of scenarios. The SDM (also referred to as a "driving policy model" or simply as a "driving model"), may be implemented as part of a fully or semi-autonomous vehicle control system, such as an advanced driving assistance (ADAS) system and/or a driving assistance and automated driving system.

A SDM may thus be represented as any suitable number of SDM parameters, any suitable subset of which being related as part of a mathematical model formalizing an interpretation of applicable laws, standards, policies, etc., which are applicable to self-driving (such as ground) vehicles and/or other suitable types of vehicles that may implement fully autonomous or semi-autonomous functions and which may utilize tools such as the aforementioned adaptive cruise control, automated braking or steering, etc. For instance, a SDM may be designed to achieve three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic, and in turn limit the scalability of system deployment; and third, the interpretation should be efficiently verifiable in the sense that it can be rigorously proven that the self-driving (autonomous) vehicle correctly implements the interpretation of the law. An implementation in a host vehicle of a SDM, illustratively, may be or include an implementation of a mathematical model for safety assurance that enables identification and performance of proper responses to dangerous situations such that self-perpetrated accidents can be avoided.

A SDM may implement logic that is applied to the SDM parameters to apply driving behavior rules such as the following five rules, for instance:

Do not hit someone from behind.
Do not cut-in recklessly.
Right-of-way is given, not taken.
Be careful of areas with limited visibility.
If you can avoid an accident without causing another one, you must do it.

It is to be noted that these rules are not limiting and not exclusive, and can be amended in various designs as desired. The rules rather represent a social driving contract that might be different depending on the region, and may also develop over time. While these five rules are currently applicable in most of the countries, they might not be complete and may be amended.

Vehicle and Accompanying Safety System

FIG. 1 shows a vehicle 100 including a safety system 200 (see also FIG. 2) in accordance with the present disclosure. The vehicle 100 and the safety system 200 are exemplary in nature, and may thus be simplified for explanatory purposes. Locations of elements and relational distances (as discussed above, the Figures are not to scale) and are provided as non-limiting instances. The safety system 200 may include various components depending on the requirements of a particular implementation and/or application.

As shown in FIG. 1 and FIG. 2, the safety system 200 may include one or more processors 102, one or more image acquisition devices 104 such as one or more cameras, one or more position sensors 106 such as a Global Navigation Satellite System (GNSS), a Global Positioning System (GPS), one or more memories 202, one or more map databases 204, one or more user interfaces 206 (such as a display, a touch screen, a microphone, a loudspeaker, one or more buttons and/or switches, and the like), and one or more wireless transceivers 208, 210, 212.

The wireless transceivers 208, 210, 212 may be configured to operate in accordance with any suitable number and/or type of desired radio communication protocols or standards. A wireless transceiver (a first wireless transceiver 208) may be configured in accordance with a Short Range mobile radio communication standard such as Bluetooth, Zigbee, and the like. A wireless transceiver (a second wireless transceiver 210) may be configured in accordance with a Medium or Wide Range mobile radio communication standard such as a 3G (Universal Mobile Telecommunications System—UMTS), a 4G (Long Term Evolution—LTE), or a 5G mobile radio communication standard in accordance with corresponding 3GPP (3rd Generation Partnership Project) standards, the most recent version at the time of this writing being the 3GPP Release 16 (2020).

A wireless transceiver (a third wireless transceiver 212) may be configured in accordance with a Wireless Local Area Network communication protocol or standard such as in accordance with IEEE 802.11 Working Group Standards, the most recent version at the time of this writing being IEEE Std 802.11™—2020, published Feb. 26, 2021 (such as 802.11, 802.11a, 802.11b, 802.11g, 802.11n, 802.11p, 802.11-12, 802.11ac, 802.11ad, 802.11ah, 802.11ax, 802.11ay, and the like). The one or more wireless transceivers 208, 210, 212 may be configured to transmit signals via an antenna system (not shown) using an air interface. One or more of the transceivers 208, 210, 212 may be configured to implement one or more vehicle to everything (V2X) communication protocols, which may include vehicle to vehicle (V2V), vehicle to infrastructure (V2I), vehicle to network (V2N), vehicle to pedestrian (V2P), vehicle to device (V2D), vehicle to grid (V2G), and any other suitable communication protocols.

The one or more processors 102 may implement any suitable type of processing circuitry and architecture, and may be configured as a controller implemented by the vehicle 100 to perform various vehicle control functions. The one or more processors 102 may be configured to function as a controller for the vehicle 100 to analyze sensor data and received communications, to calculate specific actions for the vehicle 100 to execute, and to cause the corresponding action to be executed, which may be in accordance with an AV or ADAS system, for instance.

The one or more processors 102 may include one or more application processors 214A, 214B, an image processor 216, a communication processor 218, and additionally or alternatively may include any other suitable processing device not shown in the Figures. Similarly, image acquisition devices 104 may include any suitable number of image acquisition devices and components depending on the requirements of a particular application. Image acquisition devices 104 may include one or more image capture devices (such as cameras, charge coupling devices (CCDs), or any other type of image sensor). The safety system 200 may also include a data interface communicatively connecting the one or more processors 102 to the one or more image acquisition devices 104. A first data interface may include any wired and/or wireless first link 220, or first links 220 for transmitting image data acquired by the one or more image acquisition devices 104 to the one or more processors 102, such as to the image processor 216.

The wireless transceivers 208, 210, 212 may be coupled to the one or more processors 102, such as to the communication processor 218 via a second data interface. The second data interface may include any wired and/or wireless second link 222 or second links 222 for transmitting radio transmitted data acquired by wireless transceivers 208, 210, 212 to the one or more processors 102, such as to the communication processor 218. Such transmissions may also include communications (one-way or two-way) between the vehicle 100 and one or more other (target) vehicles in an environment of the vehicle 100 (such as to facilitate coordination of navigation of the vehicle 100 in view of or together with other (target) vehicles in the environment of the vehicle 100), or even a broadcast transmission to unspecified recipients in a vicinity of the transmitting vehicle 100. These communications may include messages and/or control messages that are transmitted between the vehicles while traveling together.

The memories 202 as well as the one or more user interfaces 206 may be coupled to each of the one or more processors 102, via a third data interface. The third data interface may include any wired and/or wireless third link 224 or third links 224. Furthermore, the position sensor 106 may be coupled to each of the one or more processors 102, via the third data interface.

Each processor 214A, 214B, 216, 218 of the one or more processors 102 may be implemented as any suitable number and/or type of hardware-based processing devices (processing circuitry), and may collectively, i.e. with the one or more processors 102, form one or more type of controllers as discussed herein. The architecture shown in FIG. 2 is provided for ease of explanation, and the vehicle 100 may include any suitable number of the one or more processors 102, each of which may be similarly configured to utilize data received via the various interfaces and perform a specific task.

The one or more processors 102 may form a driver scoring controller 300 (FIG. 3) that is configured to perform alert/event clustering, road accident proneness (RAP) scoring determinations, and driver score determinations as discussed further herein. For example, the determination of one or more RAP scores may be based on alerts generated during a trip, including RAP scores for particular road clusters/segments of the trip. The functions performed by the driver scoring controller 300 may be implements in a single processor 102 or distributed across multiple of the processors 102.

The driver scoring controller 300 may receive data from respectively coupled components as shown in FIG. 2 via respective interfaces (220, 222, 224, 232, etc.), with the wireless transceivers 208, 210, and/or 212 providing data to the respective controller via the second links 222, which function as communication interfaces between the respective wireless transceivers 208, 210, and/or 212 and each respective controller.

The application processors 214A, 214B may individually represent respective controllers that work in conjunction with the one or more processors 102 to perform specific controller-related tasks. For instance, the application processor 214A may be implemented as a driver scoring controller, whereas the application processor 214B may be implemented as a different type of controller that is configured to perform other types of tasks as discussed further herein. The one or more processors 102 may receive data from respectively coupled components as shown in FIG. 2 via the various interfaces 220, 222, 224, 232, etc., and the communication processor 218 may provide communication data received from other vehicles (or to be transmitted to other vehicles) to each controller via the respectively coupled links 240A, 240B, which function as communication interfaces between the respective application processors 214A, 214B and the communication processors 218.

The one or more processors 102 may additionally be implemented to communicate with any other suitable components of the vehicle 100 to determine a state of the vehicle while driving or at any other suitable time. For instance, the vehicle 100 may include one or more vehicle computers, sensors, ECUs, interfaces, etc., which may collectively be referred to as vehicle components 230 as shown in FIG. 2. The one or more processors 102 are configured to communicate with the vehicle components 230 via an additional data interface 232, which may represent any suitable type of links and operate in accordance with any suitable communication protocol (such as CAN bus communications). Using the data received via the data interface 232, the one or more processors 102 may determine any suitable type of vehicle status information (vehicle data) such as the current drive gear, current engine speed, acceleration capabilities of the vehicle 100, etc.

In any event, the one or more processors may include any suitable number of other processors 214A, 214B, 216, 218, each of which may comprise a sub-processor and/or include a microprocessor, pre-processors (such as an image pre-processor), graphics processors, a central processing unit (CPU), support circuits, digital signal processors, integrated circuits, memory, or any other types of devices suitable for running applications and for data processing (image processing, audio processing, etc.) and analysis and/or to enable vehicle control to be functionally realized. Each processor 214A, 214B, 216, 218 may include any suitable type of single or multi-core processor, mobile device microcontroller, central processing unit, etc. These processor types may each include multiple processing units with local memory and instruction sets. Such processors may include video inputs for receiving image data from multiple image sensors, and may also include video out capabilities.

Any of the processors 214A, 214B, 216, 218 disclosed herein may be configured to perform certain functions in accordance with program instructions, which may be stored in a memory of the one or more memories 202. In other words, a memory of the one or more memories 202 may store software that, when executed by a processor (by the one or more processors 102, one or more of the processors 214A, 214B, 216, 218, etc.), controls the operation of the safety system 200. A memory of the one or more memories 202 may store one or more databases and image processing software, as well as a trained system, such as a neural network, or a deep neural network. The one or more memories 202 may include any number of random access memories, read only memories, flash memories, disk drives, optical storage, tape storage, removable storage, or any other suitable types of storage.

The safety system 200 may further include components such as a speed sensor 108 (such as a speedometer) for measuring a speed of the vehicle 100. The safety system may also include one or more accelerometers (either single axis or multiaxis) (not shown) for measuring accelerations of the vehicle 100 along one or more axes. The safety system 200 may further include additional sensors or different sensor types such as an ultrasonic sensor, a thermal sensor, one or more radar sensors 110, one or more LIDAR sensors 112 (which may be integrated in the head lamps of the vehicle 100), digital compasses, and the like. The radar sensors 110 and/or the LIDAR sensors 112 may be configured to provide pre-processed sensor data, such as radar target lists or LIDAR target lists. The third data interface (one or more links 224) may couple the speed sensor 108, the one or more radar sensors 110, and the one or more LIDAR sensors 112 to at least one of the one or more processors 102.

The one or more memories 202 may store data in a database or in any different format, which may indicate a location of known landmarks. The one or more processors 102 may process sensory information (such as images, radar signals, depth information from LIDAR or stereo processing of two or more images) of the environment of the vehicle 100 together with position information, such as a GPS coordinate, a vehicle's ego-motion, etc., to determine a current location and/or orientation of the vehicle 100 relative to the known landmarks and refine the determination of the vehicle's location. Certain designs of this technology may be included in a localization technology such as a mapping and routing model.

The one or more memories 202 may store alert/event data including one or more alerts/events. Clusters of the alerts/events generated from cluster processing as described herein may also be stored in the one or more memories 202.

The map database 204 may include any suitable type of database storing (digital) map data for the vehicle 100, for the safety system 200. The map database 204 may include data relating to the position, in a reference coordinate system, of various items, including roads, water features, geographic features, businesses, points of interest, restaurants, gas stations, etc., as well as parameters of such items, such as road width, grade, slope, elevation, or the like. The map database 204 may store not only the locations of such items, but also descriptors relating to those items, including names associated with any of the stored features. A processor of the one or more processors 102 may download information from the map database 204 over a wired or wireless data connection to a communication network (such as over a cellular network and/or the Internet, etc.). In some cases, the map database 204 may store a sparse data model including polynomial representations of certain road features (such as lane markings) or target trajectories for the vehicle 100. The map database 204 may also include stored representations of various recognized landmarks that may be provided to determine or update a known position of the vehicle 100 with respect to a target trajectory. The landmark representations may include data fields such as landmark type, landmark location, among other potential identifiers. The map database 204 can also include non-semantic features including point clouds of certain objects or features in the environment, and feature point and descriptors. The map database 204 may also include road/infrastructure condition and/or quality data, road quality issue instances, such as identified or potential hazardous instances (e.g. potholes; impaired, stopped, or crashed vehicles; debris in the roadway; construction events; weather impairments (flooding, mudslide, washed-out road), or other obstructions or hazards as would be understood by one of ordinary skill in the art. The map database 204 may be dynamically updated (e.g. by the database provider, vehicle manufacture, or the like) to include changes to the map data. In some instances, the map database 204 is updated in response to driver submissions of new map data and/or driver submitted revisions to existing map data.

Furthermore, the safety system 200 may implement the aforementioned SDM as part of any suitable type of control system, which may form part of an advanced driving assistance system (ADAS) or a driving assistance and automated driving system. The safety system 200 may include a computer implementation of a formal model such as the SDM. As described above, the vehicle 100 may include the safety system 200 as also described with reference to FIG. 2. The vehicle 100 may include the one or more processors 102, which may be integrated with or separate from an engine control unit (ECU) of the vehicle 100. The safety system 200 may generate data to control or assist to control the ECU and/or other components of the vehicle 100 to directly or indirectly control the driving of the vehicle 100.
General Operation of the Vehicle 100 and Driver Scoring Controller 300

Figure 3:
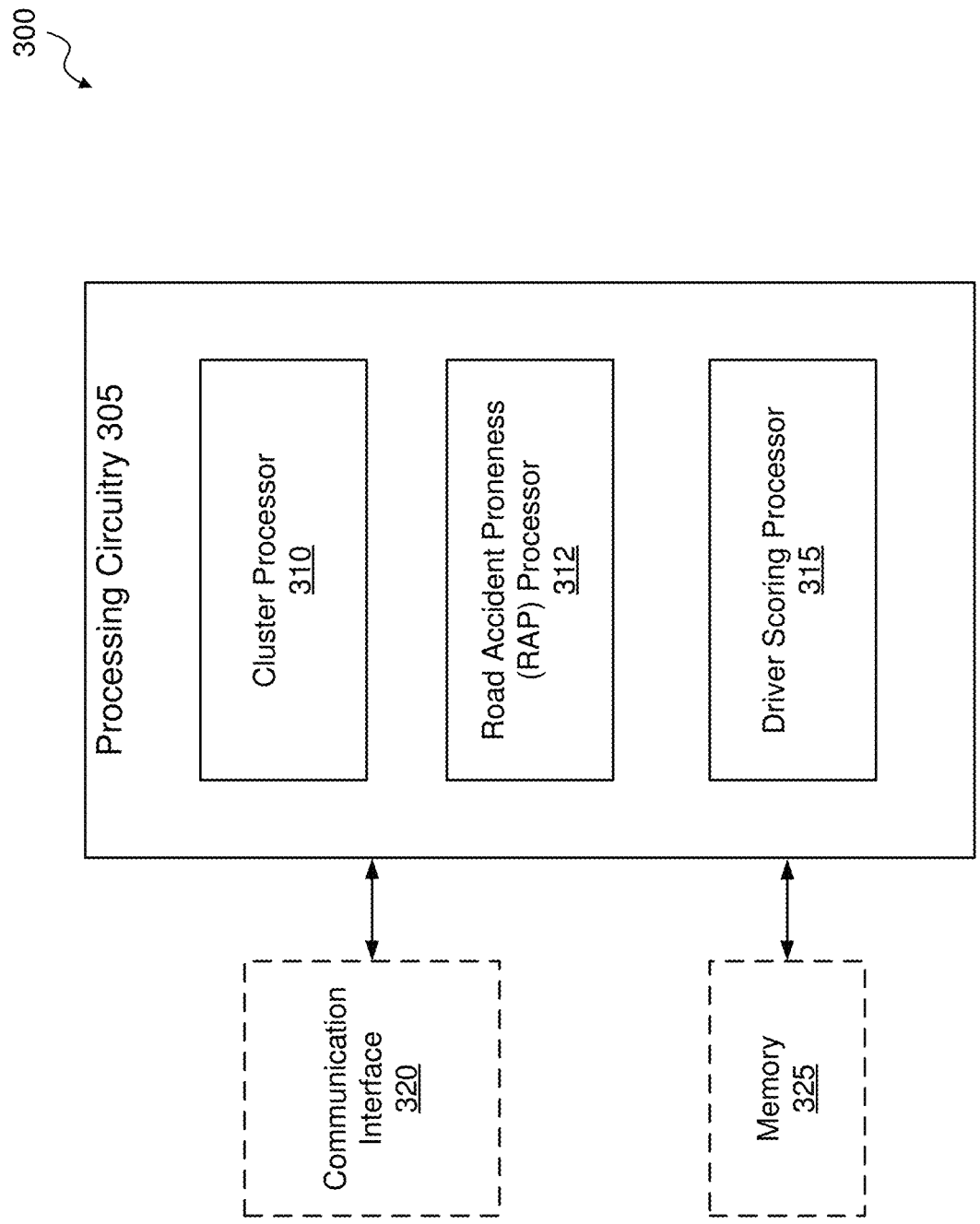
FIG. 3 illustrates a driver scoring controller in accordance with the present disclosure.

A driver scoring controller 300 of a vehicle is provided. With reference to FIG. 3, the controller 300 may include processing circuitry 305. The controller 300 may optionally include a communication interface 320 and/or memory 325. The operation of the controller 300 is further illustrated in FIG. 8. The memory 325 may correspond to the one or more memories 202 (FIG. 2) in one or more examples.

The controller 300 (e.g. via communication interface 320) is configured to receive data from one or more components of the vehicle and/or from one or more external sources outside the vehicle using one or more communication protocols (e.g. 5G, vehicle-to-everything (V2X) communication protocol). For example, the controller 300 may receive: sensor data from one or more sensors of the vehicle 100 and/or from one or more external sensors (e.g. mobile device of an occupant of the vehicle); map data from map database 204 (FIG. 2). The communication interface 320 may be a transceiver (e.g. Tx/Rx 208, 210, 212) configured to transmit and receive data/information using one or more wireless and/or wired communication protocols/technologies. The controller 300 is configured to determine one or more alerts/events based on the received sensor data, and/or receive alert/event information generated by one or more other components of the vehicle 100 and/or from one or more external sources.

The memory 325 may store map data, road condition data, alert/event data, driver score data, sensor data, and/or other data as would be understood by one of ordinary skill in the art. The memory 325 may additionally or alternatively store instructions that when executed by the processing circuitry 305, cause the processing circuitry 305 to perform one or more functions of the controller 300.

The processing circuitry 305 is configured to process data (e.g. map data, sensor data, alert/event data), received by the controller 300 and/or accessed from memory 325, to perform alert/event clustering, road accident proneness (RAP) scoring determinations, and driver score determinations according to the disclosure. For example, the determination of one or more RAP scores may be based on alerts generated during a trip, including RAP scores for particular road clusters/segments of the trip. Advantageously, by using the accident proneness of the road segments, the driver scores determined by the processing circuitry 305 reflect contributions of the accident proneness affecting the driver scores; and therefore advantageously increases the accuracy of the scoring and categorization of the driver. To accurately determine the accident proneness of a road (e.g. its associated risk), the relative criticality of the different alerts raised on the road are considered. According to the disclosure, a road accident proneness (RAP) score is determined for each road segment by considering the number of alerts raised in the road segment, which may be weighted by a criticality weighting factor. The score may then normalized by dividing the score by the number of trips having passed through the segment to arrive at an average RAP score for the segment. According to the disclosure, the road segment may be determined by performing clustering processing on the total number of alerts to identify clusters of alerts. In this example, a cluster may be referred to as a segment, and vice versa. The determination of the average RAP score is then repeated for each of the clusters. A respective driver RAP score is determined for each cluster in which the driver has traversed. The driver RAP score for each traversed cluster and the corresponding average RAP score for those clusters are then used to determine the overall driver score. The operation of the controller 300, including the processing circuitry 305 is illustrated with reference to FIGS. 5 and 6, which illustrate flowcharts of driver score determining methods according to the disclosure.

The processing circuitry 305 of the controller 300 may include a cluster processor 310, a RAP processor 312, and a driver score processor 315.

Figure 4A:
FIG. 4A illustrates a heat map of alerts in accordance with the present disclosure.
Figure 4B:
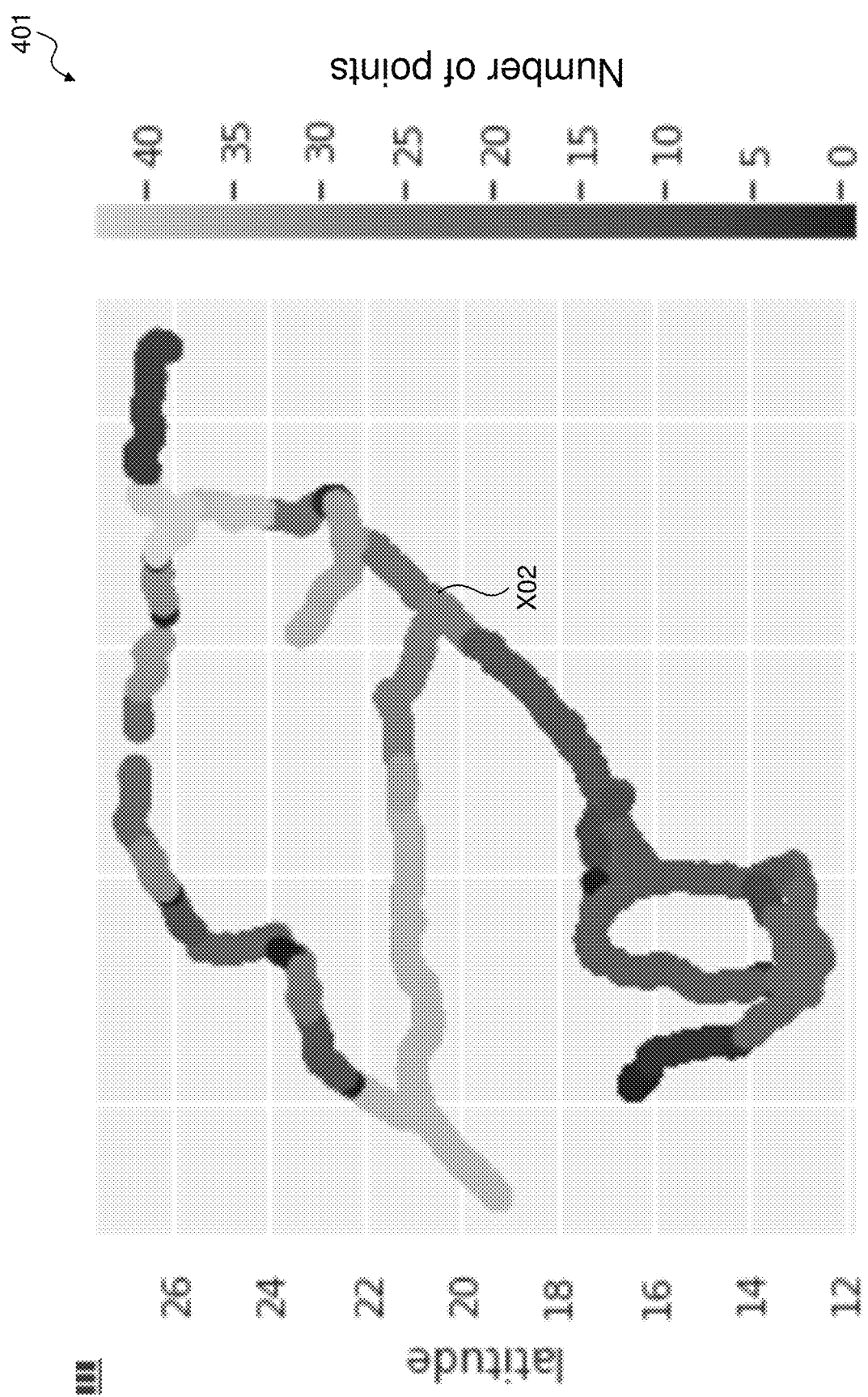
FIG. 4B illustrates a clustering of alerts, in accordance with the present disclosure, corresponding to the head map of FIG. 4A.
Figure 5:
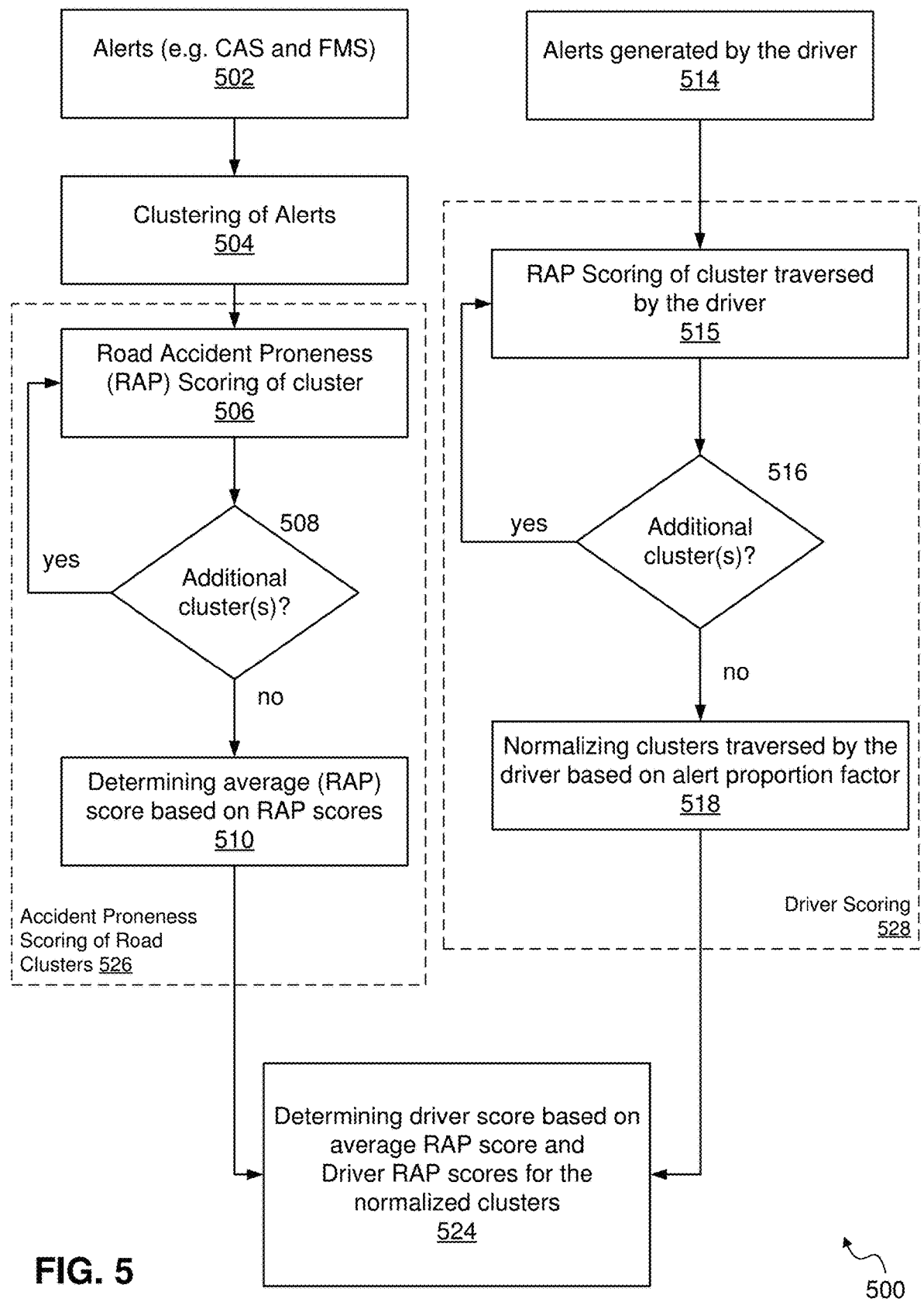
FIG. 5 is a process flow of road accident proneness scoring to determine a driver score in accordance with the present disclosure.
Figure 6:
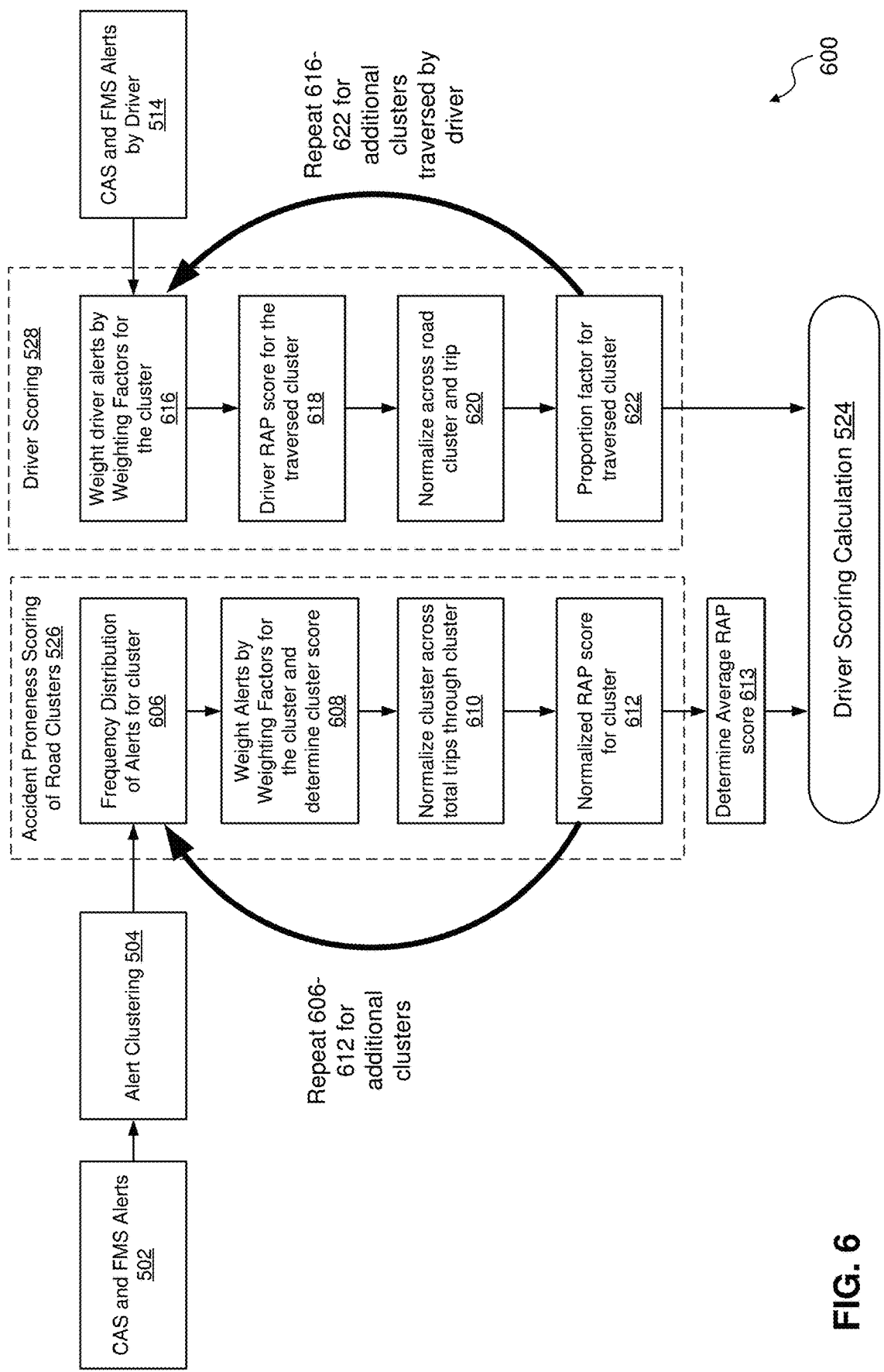
FIG. 6 is a process flow of road accident proneness scoring to determine a driver score in accordance with the present disclosure.

According to the disclosure, the cluster processor 310 is configured to perform cluster processing on a set of alerts/events to determine one or more clusters of alerts. FIG. 4A illustrates a heat map 400 of alerts. In this example, the heat map includes 41543 alerts generated over 1348 trips. Each point represents the coordinate of the alert. The precision of the coordinates is 6 decimal points (accurate up to 0.11 m). FIG. 4B shows a clustering 401 of the alerts corresponding heat map of alerts shown in FIG. 4A. As illustrated in FIGS. 5 and 6, alerts 502 that have been previously obtained are clustered at operation 504. The cluster processor 310 may be configured to use one or more clustering methodologies as would be understood by one of ordinary skill in the art. For example, the cluster processor 310 may perform clustering of the alerts according to their spatial occurrence (latitude, longitude) using a density based approach. The clustering methodology may use Hierarchical Density Based Clustering (HDBSCAN), but is not limited thereto. Other clustering algorithms may be used as would be understood by one of ordinary skill in the art. HDBSCAN is a density-based, non-parametric method that looks for a cluster hierarchy shaped by the multivariate modes of the underlying distribution. Rather than looking for clusters with a particular shape, it looks for regions of the data that are denser than the surrounding space. With the HDBSCAN algorithm, the only input parameter is the minimum number of points in each cluster (min_cluster_size). The example cluster map in FIG. 4B was generated with the minimum number of points in each cluster having a value of 5 (min_cluster_size=5). In this example, the clustering of the 41543 alerts generated 43 clusters of alerts (i.e. 43 different road segments).

The clusters are then subjected to accident proneness scoring (operation 506) by the RAP processor 312. The operation of the RAP processor 312 is illustrated collectively in operation 526 of FIGS. 5 and 6. The RAP processor 312 is configured to determine one or more RAP scores, including average RAP scores (operation 510 in FIG. 5; operation 612 in FIG. 6) for one or more (e.g. all) clusters within a data set of alerts and driver RAP scores for particular trip taken by a driver. The RAP scores may be based on weighted alerts, and the RAP processor 312 may be configured to weight one or more alerts by respective weighting factors (operation 506 in FIG. 5; operation 608 in FIG. 6). The weighting factors may be predetermined to associate different criticality levels to the alerts. For example, a FCW alert may be more critical than a LDW alert; and therefore, the FCW alerts may be weighted more than the LDW alerts. Table 1 below illustrates example weighting factors for various different alert types and corresponding vehicle speed.

TABLE 1

Weights of Alerts

| Alert | Speed | Weight |
|---|---|---|
| FCW | <30 km/hr | 4 |
|  | >=30 km/hr | 5 |
| PCW | <30 km/hr | 4 |
|  | >=30 km/hr | 5 |
| HMW | <30 km/hr | 2 |
|  | >=30 km/hr | 3 |
| Right LDW | >55 km/hr | 2 |
| Left LDW | >55 km/hr | 2 |
| Free-run |  | 4 |
| Speeding |  | 4 |
| Hard brake |  | 4 |
| Idling |  | 1 |
| stoppage |  | 1 |

As shown in FIG. 5, operation 525 may include operations 506, 508, and 510. At operation 506, the RAP processor 312 determines a RAP score for the cluster, which includes determining the number of alerts for each type of alert within the cluster. The number of each alert type is weighted based on a respective weighting factor. For example, the determination of the RAP score for the cluster may be performed according to the following Equation 1:

$$RAPScore_x = (N_1) \times (w_1) + (N_2) \times (w_2) + \ldots (N_a) \times (w_n) \quad (1)$$

Where N is the number of alerts for a particular alert type (e.g. $N_1$ is the number of alerts for a first alert type (e.g. FCW alert), and w is the weighting factor for the corresponding alert type (e.g. $w_1$ is the weighting factor for the first alert type).

At operation 508, the RAP processor 312 determines if additional clusters are to be processed so as to determine corresponding RAP scores for one or more additional clusters. If there are one or more additional clusters (YES at operation 508), the flowchart 500 returns to operation 506 where the RAP processor 312 determines the corresponding RAP score for the current cluster. Otherwise (NO at operation 508), the flowchart transitions to operation 510 where The RAP processor 312 is configured to determine an average RAP score based on the RAP score(s) of the corresponding cluster(s).

At operation 510, the RAP processor 312 may determine a normalized RAP score for each of the clusters based on their respective RAP scores. The normalized RAP score is obtained by dividing the RAP score by the number of trips that have passed through the corresponding cluster. The determination of the normalized RAP score (RAPScore$_{normalized}$) for the corresponding cluster may be performed according to the following Equation 2:

$$RAPScore_{normalized(x)} = \frac{RAPScore_x}{T_x}$$

Where $T_x$ is the number of trips that have passed through the cluster and RAPScore$_x$ is the RAP score for the corresponding cluster.

To determine an average RAP score based on the RAP score(s) (e.g. based on the normalized RAP scores) of the corresponding cluster(s), the RAP processor 312 determines the sum of the normalized RAP scores and divide the total RAP score value by the number of RAP scores (i.e. the number of clusters). The determination of the average RAP score (RAPScore$_{Average}$) for may be performed according to the following Equation 3:

$$RAPScore_{Average} = \frac{RAPScore_{normalized(1)} + RAPScore_{normalized(2)} \ldots + RAPScore_{normalized(n)}}{n} \quad (3)$$

The average RAP score (RAPScore$_{Average}$) may then be stored in memory 325 and later accessed for determining of the driver score of the vehicle 100 as discussed in more detail below. The average RAP score (RAPScore$_{Average}$) may alternatively or additionally be stored in an external memory (e.g. an external device such as controller 850 in FIGS. 8A-8B) and accessed by the controller 300 via the communication interface 320.

The RAP processor 312 determines one or more alerts/events 514 generated by the vehicle 100, such as by the Fleet Management Systems (FMS), Collision Avoidance Systems (CAS), Driver Monitoring Systems (DMS), or other monitoring system as would be understood by one of ordinary skill in the art. The alerts 514 may be determined based on data from one or more of the monitoring systems and/or the alerts may be generated by the monitoring system(s) and provided to the controller 300 (via the communication interface 320.

The alerts 514 are then subjected to accident proneness scoring (operation 515) by the RAP processor 312. The operation of the RAP processor 312 for driver-specific RAP scoring is illustrated collectively in operation 528 of FIGS. 5 and 6. The RAP processor 312 is configured to determine one or more RAP scores (operation 515 in FIG. 5; operation 618 in FIG. 6) for corresponding clusters in which the driver has traversed in or through for particular trip taken by the driver. The RAP scores may be based on weighted alerts, and the RAP processor 312 may be configured to weight one or more alerts by respective weighting factors (operation 515 in FIG. 5; operation 616 in FIG. 6). The weighting factors associate different criticality levels to the alerts, and may be the same weighting factors used in the RAP scoring for all clusters within the data set (operation 526) and provided in Table 1.

As shown in FIG. 5, operation 528 may include operations 515, 516, and 518. At operation 515, the RAP processor 312 determines a RAP score for a cluster in which the driver has traversed including one or more of the determined alerts. The RAP processor 312 may determine the number of alerts per traversed cluster to determine a frequency distribution of the alerts. The RAP processor 312 may also determine the type of each of the alerts occurring in the cluster. Based on the number and type of alerts, the RAP processor 312 may weight the different alert types based on a respective weighting factor (e.g. as shown in Table 1). For example, the determination of the RAP score (RAPScore$_{Driver\ (x)}$) for the traversed cluster may be performed according to the following Equation 4, which is similar to Equation 1 described above.

$$RAPScore_{driver\ (x)} = (N_1) \times (w_1) + (N_2) \times (w_2) + \ldots (N_a) \times (w_a) \quad (4)$$

Where N is the number of alerts for a particular alert type (e.g. $N_1$ is the number of alerts for a first alert type (e.g. FCW alert), and w is the weighting factor for the corresponding alert type (e.g. $w_1$ is the weighting factor for the first alert type).

At operation 516, the RAP processor 312 determines if additional clusters have been traversed by the driver and are to be subject to corresponding RAP scoring. If there are one or more additional traversed clusters (YES at operation 516), the flowchart 500 returns to operation 515 where the RAP processor 312 determines the corresponding RAP score for the additional traversed cluster. Otherwise (NO at operation 516), the flowchart transitions to operation 518 where The RAP processor 312 is configured to determine a total RAP score based on the RAP score(s) of the corresponding cluster(s) traversed by the driver.

At operation 518, the RAP processor 312 may normalize each of the clusters traversed by the driver based on the alerts occurring in the respective clusters and the total number of alerts occurring during the traversed route by the driver. The proportion factor ($P_x$) (may also be referred to as a normalization factor) corresponding to the proportion of the alerts for the respective cluster may be determined according to the following equation 5:

$$P_x = \frac{Alerts_x}{Alerts_{total}} \quad (5)$$

Where $Alerts_x$ is the number of alerts in the cluster and $Alerts_{total}$ is the total number of alerts determined for the traversed route.

After operation 518, the flowchart transitions to operation 524 where the driver score processor 315 is configured to determine the driver score based on the average RAP score from operation 526 and the driver RAP scores for each of the normalized clusters traversed by the driver. The driver score (Score$_{driver}$) may be determined according to the following equation 6:

$$Score_{driver} = (RAPScore_{driver(1)} - RAPScore_{Average}) \times P_1 + (RAPScore_{driver(2)} - RAPScore_{Average}) \times P_2 \ldots + (RAPScore_{driver(n)} - RAPScore_{Average}) \times P_n \quad (6)$$

Where the RAPScore$_{Driver\ (x)}$ is the Driver RAP score for the respective traversed cluster, RAPScore$_{Average}$ is the average RAP score for the clusters within the dataset, and $P_x$ is the proportion/normalization factor corresponding to the proportion of the alerts for the respective cluster with respect to the total number of alerts in the dataset.

For a particular cluster/segment, if the RAPScore$_{Driver}$ is greater than the average RAP score (RAPScore$_{Average}$), the cluster will have a positive value in the driver score (Score$_{driver}$) determination. This reflects that the driver has performed worse than the average driver for the cluster. Conversely, if the RAPScore$_{Driver}$ is less than the average RAP score (RAPScore$_{Average}$), the cluster will have a negative value in the driver score (Score$_{driver}$) determination. This reflects that the driver has performed better than the average driver for the particular cluster.

Similarly, a positive driver score (Score$_{driver}$) reflects that the driver has performed worse than the average driver for the collective clusters forming the traversed route of the driver while a negative driver score (Score$_{driver}$) reflects that the driver has performed better than the average driver for the collective clusters forming the traversed route.

The driver score processor 315 may also be configured to normalize the driver score (Score$_{driver}$) according to a value range (e.g. between 0-10). In this example, a normalized driver score of 0 reflects the best driving performance while 10 reflects the worst driving performance.

The Road Accident Proneness (RAP) Scoring of Road Clusters in operation 526 and the driver scoring in operation 528 according to the disclosure are further illustrated in FIG. 6. The other operations in FIG. 6 correspond to the operations in FIG. 5, and further discussion is omitted for brevity.

The Road Accident Proneness (RAP) Scoring of Road Clusters in operation 526 may include operations 606, 608, 610, and 612 according to the disclosure as shown in FIG. 6. In operations 606, the RAP processor 312 is configured to determine the number of alerts within a first cluster. A frequency distribution of the alerts may then be determined after the number of alerts in the clusters of the dataset are determined.

At operation 608, the RAP processor 312 is configured to weight the alerts within the first cluster and to determine a RAP score for the cluster based on the weighted alerts. The alerts may be waiting according to weighting factors, such as those shown in Table 1. The determination of the RAP score for the cluster may be performed according to the following Equation 1:

$$RAPScore_x = (N_1) \times (w_1) + (N_2) \times (w_2) + \ldots (N_n) \times (w_n) \quad (1)$$

Where N is the number of alerts for a particular alert type (e.g. $N_1$ is the number of alerts for a first alert type (e.g. FCW alert), and w is the weighting factor for the corresponding alert type (e.g. $w_1$ is the weighting factor for the first alert type).

After operation 608, the flowchart transitions to operation 610 where the RAP processor 312 determines a normalized RAP score for the cluster based on the respective RAP score. The normalized RAP score is obtained (at operation 612) by dividing the RAP score by the number of trips that have passed through the corresponding cluster. The determination of the normalized RAP score (RAPScore$_{normalized}$) for the corresponding cluster may be performed according to the following Equation 2:

$$RAPScore_{normalized(x)} = \frac{RAPScore_x}{T_x}$$

Where $T_x$ is the number of trips that have passed through the cluster and RAPScore$_x$ is the RAP score for the corresponding cluster.

After the normalized RAP score is provided at operation 612, the flowchart returns to operation 606 if additional clusters are to be processed and the operations 606-612 are repeated for the next cluster.

After all the clusters have been processed, the flowchart transitions to operation 613 where the RAP processor 312 is configured to determine an average RAP score based on the normalized RAP scores of the corresponding cluster(s), the RAP processor 312 determines the sum of the normalized RAP scores and divide the total RAP score value by the number of RAP scores (i.e. the number of clusters). The determination of the average RAP score (RAPScore$_{Average}$) for may be performed according to the following Equation 3:

$$RAPScore_{Average} = \frac{RAPScore_{normalized(1)} + RAPScore_{normalized(2)} \ldots + RAPScore_{normalized(n)}}{n} \quad (3)$$

The average RAP score (RAPScore$_{Average}$) may then be stored in memory 325 and later accessed for determining of the driver score of the vehicle 100. The average RAP score (RAPScore$_{Average}$) may alternatively or additionally be stored in an external memory (e.g. an external device such as controller 850 in FIGS. 8A-8B) and accessed by the controller 300 via the communication interface 320.

The driver scoring in operation 528 may include operations 616, 618, 620, and 622.

At operation 616, the RAP processor 312 determines the total number of alerts for the traversed route based on the alerts provided in operation 514. The total number of alerts may be used by the RAP processor 312 to determine a frequency distribution of the alerts. Based on the number of alerts in in a first traversed cluster, the RAP processor 312 weights the different alert types in the cluster based on a respective weighting factor (e.g. as shown in Table 1) to determine the driver RAP score for the cluster at operation 618. For example, the determination of the RAP score (RAPScore$_{Driver\ (x)}$) for the traversed cluster may be performed according to the following Equation 4, which is similar to Equation 1 described above.

$$RAPScore_{driver\ (x)} = (N_1) \times (w_1) + (N_2) \times (w_2) + (N_a) \times (w_n) \quad (4)$$

Where N is the number of alerts for a particular alert type (e.g. N$_1$ is the number of alerts for a first alert type (e.g. FCW alert), and w is the weighting factor for the corresponding alert type (e.g. w$_1$ is the weighting factor for the first alert type).

At operation 620, the RAP processor 312 normalizes the cluster traversed by the driver based on the alerts occurring in the respective cluster and the total number of alerts occurring during the traversed route by the driver. The proportion factor (P$_x$) (may also be referred to as a normalization factor) corresponding to the proportion of the alerts for the respective cluster may be determined according to the following equation 5:

$$P_x = \frac{Alerts_x}{Alerts_{total}} \quad (5)$$

Where Alerts$_x$ is the number of alerts in the cluster and Alerts$_{total}$ is the total number of alerts determined for the traversed route.

After operation 622, the RAP processor 312 determines if the traversed router includes additional clusters to be subject to corresponding RAP scoring. If there are one or more additional traversed clusters, flowchart returns to operation 616 and operations 616-622 are repeated for a next cluster of the additional traversed cluster(s).

After all the clusters have been processed, the flowchart transitions to operation 524 where the driver score processor 315 is configured to determine the driver score based on: the average RAP score from operation 613, the driver RAP scores for each of the normalized clusters traversed by the driver and the respective proportion/normalization factors. The driver score (Score$_{driver}$) may be determined according to the following equation 6:

$$Score_{driver} = (RAPScore_{driver(1)} - RAPScore_{Average}) \times P_1 + (RAPScore_{driver(2)} - RAPScore_{Average}) \times P_2 \ldots + (RAPScore_{driver(n)} - RAPScore_{Average}) \times P_n \quad (6)$$

Where the RAPScore$_{Driver\ (x)}$ is the Driver RAP score for the respective traversed cluster, RAPScore$_{Average}$ is the average RAP score for the clusters within the dataset, and P$_x$ is the proportion/normalization factor corresponding to the proportion of the alerts for the respective cluster with respect to the total number of alerts in the dataset.

Again, for a particular cluster/segment, if the RAPScore$_{Driver}$ is greater than the average RAP score (RAPScore$_{Average}$), the cluster will have a positive value in the driver score (Score$_{driver}$) determination. This reflects that the driver has performed worse than the average driver for the cluster. Conversely, if the RAPScore$_{Driver}$ is less than the average RAP score (RAPScore$_{Average}$), the cluster will have a negative value in the driver score (Score$_{driver}$) determination. This reflects that the driver has performed better than the average driver for the particular cluster.

Similarly, a positive driver score (Score$_{driver}$) reflects that the driver has performed worse than the average driver for the collective clusters forming the traversed route of the driver while a negative driver score (Score$_{driver}$) reflects that the driver has performed better than the average driver for the collective clusters forming the traversed route.

The driver score processor 315 may also be configured to normalize the driver score (Score$_{driver}$) according to a value range (e.g. between 0-10). In this example, a normalized driver score of 0 reflects the best driving performance while 10 reflects the worst driving performance.

Figure 7:
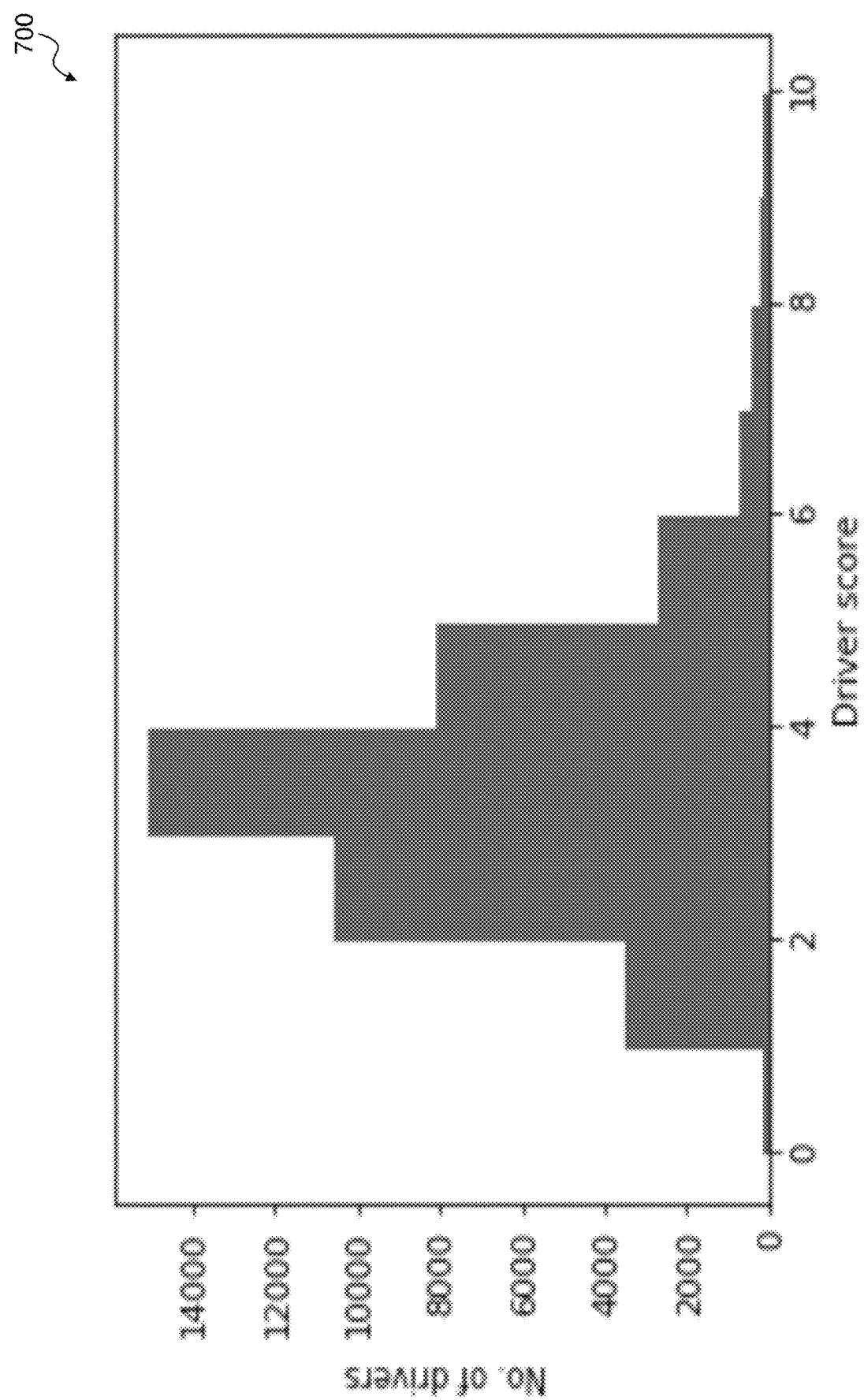
FIG. 7 illustrates an example distribution of drivers over the driver score ranges in accordance with the present disclosure

FIG. 7 shows an example distribution of drivers over the driver score ranges according to the disclosure. A majority of the drivers fall within the driver score of 3-4. The fleet management may define what values of the normalized driver score correspond to good, bad, and average drivers and incentivize/provide trainings to the drivers based on their respective scores. For example, if the fleet sets the score categories as: 0 to 3 for good drivers, 4 to 6 for average drivers, and 7 to 10 for bad drivers.

Figure 8A:
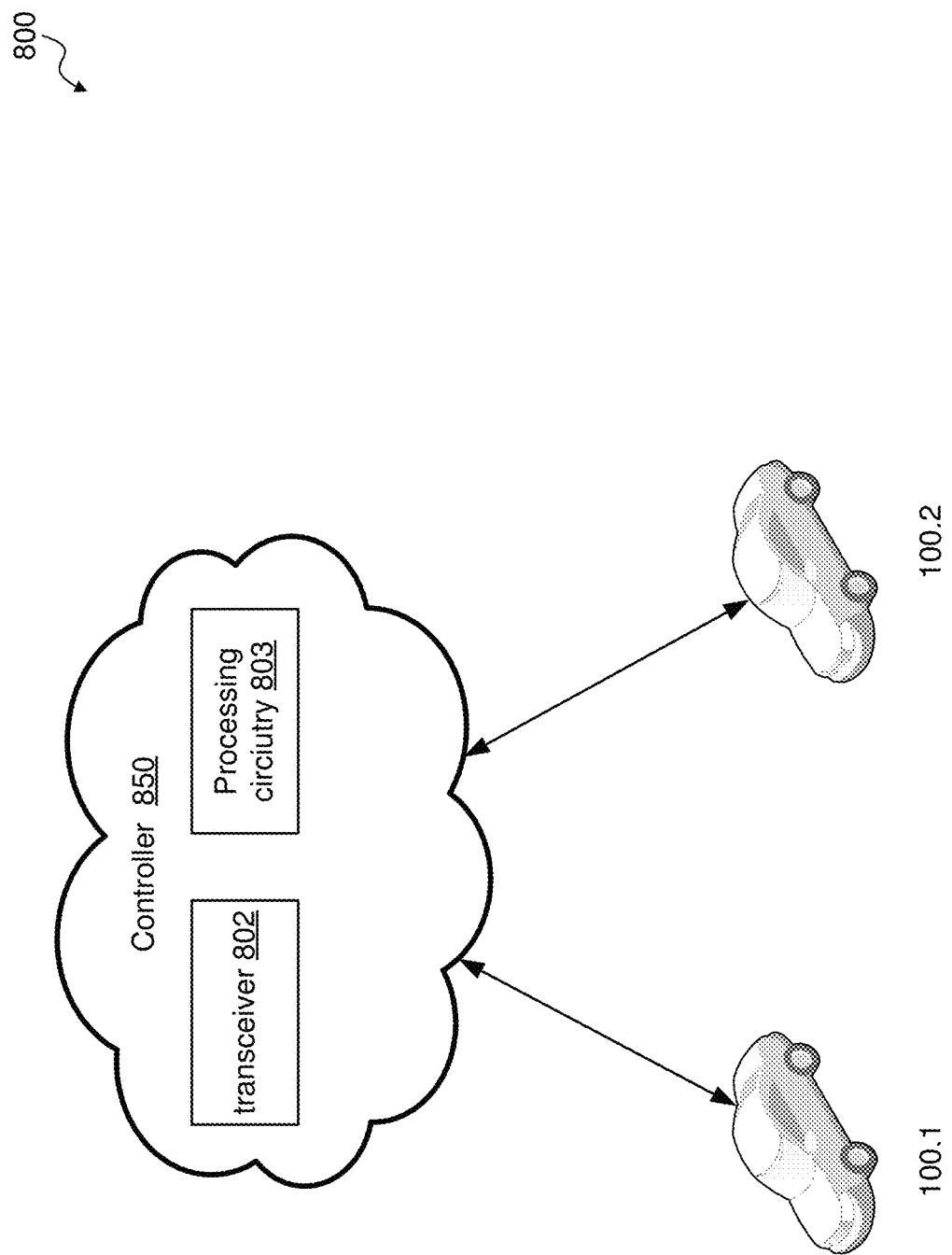
FIG. 8A illustrates a road management system in accordance with the present disclosure.
Figure 8B:
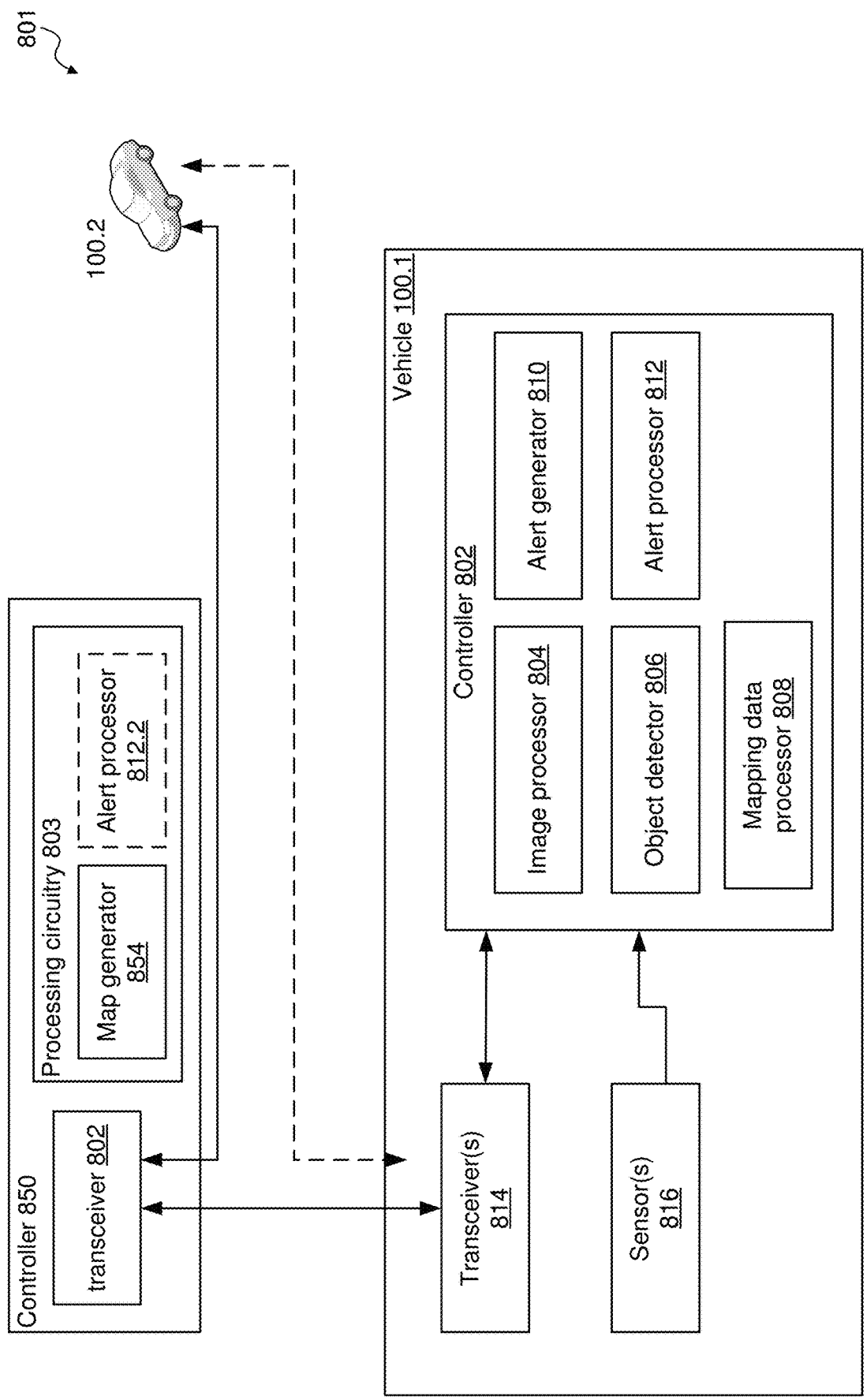
FIG. 8B illustrates a road management system in accordance with the present disclosure.

According to the disclosure, the operations of controller 300 may additionally or alternatively be performed by one or more external processing devices (e.g. controller 850 in FIGS. 8A-8B). For example, the controller 300 and the external device (e.g. controller 850) cooperatively perform the methods illustrated in FIGS. 5 and 6. In this example, the controller 850 may perform the average RAP score determinations while the controller 300 performs the RAP score determinations of the alerts generated by the corresponding vehicle 100. In another example, the vehicle may provide alert data to the external controller 850. The external controller 850 may then performs the average RAP score determination, the vehicle's RAP score determination, and/ or the overall driver score determination, alone or cooperatively with the controller 300.

With reference to FIGS. 5 and 6, the flowcharts 500 and 600 may be a computer-implemented method executed by and/or otherwise associated with one or more processors (processing circuitry) and/or storage devices. These processors and/or storage devices may be, for instance, associated with one or more components of a vehicle 100 as discussed herein with reference to FIG. 1, including the controller 300 of FIG. 3 and/or associated with one or more external processing devices (e.g. one or more external servers having corresponding processing circuitry, such as controller 850 in FIGS. 8A-8B). For instance, the processors and/or storage devices may be identified with the one or more processors 102 and/or one or more of the application processors 214A, 214B, image processor 216, communication processor 216, etc., executing computer-readable instructions stored in the memory 202, as shown and described herein with reference to FIG. 2. The one or more processors 102 and/or one or more of the application processors 214A, 214B, image processor 216, communication processor 216, etc. may additionally or alternatively work exclusively as hardware components (processing circuitry or other suitable circuitry), execute instructions stored on other computer-readable storage mediums not shown in the Figures (which may be locally-stored instructions as part of the processing circuitries themselves), and any combination thereof. The various vehicle components used to perform the methods 500 and 600 may also include other components such as one or more of the wireless transceivers 208, 210, 212, and their accompanying communication interface(s), as discussed herein with reference to FIG. 2. When the processors and/or storage devices are associated with one or more external processing devices (e.g. one or more external servers having corresponding processing circuitry), the external processing devices may perform the methods of flowcharts 500 and 600 exclusively based on information received from the vehicle 100, or may cooperatively perform the methods of flowcharts 500 and 600 with the one or more processors of the vehicle 100. For example, the external processing device (e.g. controller 850) may determine the average RAP scores for all clusters within the data set while the vehicle 100 determines a RAP score for a corresponding driver of the vehicle 100.

The flowcharts 500 and 600 may include alternate or additional steps that are not shown in FIGS. 5 and 6 for purposes of brevity, and may be performed in a different order than the steps shown.

The present disclosure also address the shortcomings of conventional road map generation systems that generally rely on lane markers and other identifiable road infrastructure to determine map data and generate corresponding maps. For example, road mapping systems identify the road types and other road infrastructure aspects, but are dependent on devices having map generation capabilities gather data for map generation, satellite systems or offline analysis of camera data by mapping systems. With such systems, road infrastructure may be impaired in developing nations, close vehicular distance, dense traffic, time of day, weather conditions, or other factors as would be understood by one of ordinary skill in the art.

As described herein, vehicle sensing systems are configured to analyze various aspects of on-road, on-vehicle or in-cabin events and raise alerts to notify the driver or vehicle monitoring systems. One or more alerts/events may be generated from the Fleet Management Systems (FMS), Collision Avoidance Systems (CAS), Driver Monitoring Systems (DMS), or other monitoring system as would be understood by one of ordinary skill in the art. For example, alerts may be generated from Driver Monitoring Systems (DMS) that detect driver behavioral events, such as distracted-driver events, impaired-driver events, phone usage, smoking, and drowsiness. Collision Avoidance System (CAS) alerts may include, for example, Forward Collision Warnings (FCW), Pedestrian Collision Warnings (PCW), Headway Monitoring Warnings (HWM), Lane Departure Warning (LDW), and/or other CAS alerts/events as would be understood by one of ordinary skill in the art. Driver behavior and/or vehicle alerts/events may include harsh movements (such as acceleration and/or velocity changes, braking, and directional changes), idling alerts (vehicle is halted but engine is running), free-run alerts (vehicle is moving but not in gear), or other alerts/events as would be understood by one of ordinary skill in the art. Harsh movements may also be referred to as harsh driving events, and may include: Harsh Acceleration (HA), Harsh Velocity (HV), Harsh Braking (HB), Harsh Curving (HC)/directional-change, or other harsh, sudden, or drastic vehicle maneuvers. The types of alerts/events are not limited hereto and may include any alerts/events that would be understood by one of ordinary skill in the art. Example alerts/events are described in Table 2 below, which includes descriptions of the alerts/events as well as applicability to determining the type of road based on the corresponding alert/event.

TABLE 2

Alert Descriptions and Applicability

| Alert | Description | Applicability to road types |
|---|---|---|
| FCW | alert for possible low-speed collision with the vehicle in front, which may assist the driver at a low speed in densely heavy traffic | Narrower roads with high traffic will result in more FCW alerts while highways will have fewer FCW alerts. Further breakdown based on the road types considered can be analyzed |
| PCW | alert for a possible pedestrian or cyclist in a danger zone and/or an imminent collision with a pedestrian or cyclist. | Localities may not have designated pedestrian crossings and people may cross anywhere convenient to them. Such alerts occur less frequently on highways |
| HMW | alert for unsafe following distance. May assist driver in maintaining a safe following distance from a leading vehicle | Narrower roads with high traffic will result in more HMW alerts, while also being prevalent on Highways. Further breakdown based on the road types considered can be analyzed. |
| Right LDW | alert when the driver leaves the current lane and departs to the right. | occurrence more on highways as there is opportunity to do so and less prevalent on narrower roads. Further breakdown based on the road types considered can be analyzed. |
| Left LDW | alert when the driver leaves the current lane and departs to the left. | occurrence more on highways as there is opportunity to do so and less prevalent on narrower roads. Further breakdown based on the road types considered can be analyzed. |
| Free-run | alert is raised when the vehicle is moving and not in gear | More prevalent on highways that have slopes. This is a common operation by truck/bus drivers. |
| Speeding | alert is raised when the vehicle is travelling at a speed greater than a predetermined threshold | More prevalent on highways. Further breakdown based on the road types considered can be analyzed. |
| Hard/harsh brake | alert is raised when the driver brakes suddenly without slowing down | More prevalent on narrower roads with high traffic as vehicles may compete to get right of way at junctions as well as to avoid pedestrians |
| Idling | alert is raised when the vehicle is halted but engine is running | More prevalent on narrow and crowded roads |
| stoppage | alert is raised when the vehicle halts | More prevalent at rest areas and residential roads, living roads |

According to the disclosure, road segment information may be used to algorithmically learn a relation between road types and warnings/alerts. The determined relationships may then be used to identify the road type for unclassified roads and/or to improve the accuracy for previously classified roads. The method according to the disclosure identifies the type of road based on alerts, such as alerts from, for example, a sequence of different Collision Avoidance Alerts (CAS), vehicular/Fleet Management System (FMS) alerts, and/or other systems as would be understood by one of ordinary skill in the art. For systems that do not have map generation capabilities that gather data for map generation (e.g. to assist in crowdsourced map generation), identification of the road type can be used to compliment mapping services. Map generation and satellite-based methods can utilize the road type classification method according to the disclosure to improve the confidence and accuracy in the map generation, satellite-based, and remote sensing data. This advantageously improves the mapping data in, for example, developing countries where many roads, although mapped, do not have attributes associated with them and have sub optimal lane markings and identifiable road infrastructure. Additionally or alternatively, the road type classification method according to disclosure may be used to compliment map generation and satellite-based methods, increasing the confidence in road type classification in areas where lane marking and road infrastructure is suboptimal and where roads are not mappable with satellites.

According to the disclosure, road type classifications may be made based on analysis of the sequence of different alerts (e.g. CAS alerts and/or FMS alerts) generated by vehicles as they traverse road segments. One or more graph analytics may be used to analyze the alerts from one or more vehicles contributing data this data. The alerts generated during each trip by a vehicle are time ordered and a graph is built where the nodes of the graph represent the different alerts generated. The attribute of the nodes is the road type. The graph is then fed into a node classification task that predicts an attribute (road type) for each node in the graph.

FIGS. 8A and 8B illustrate road management systems according to the disclosure. FIG. 8A shows system 800 that includes a controller 850 that is configured to communicate with one or more vehicles 100 via one or more communication technologies (e.g. 5G). The controller 850 may include a transceiver 802 and processing circuitry 803.

The transceiver 802 may be configured to operate in accordance with any suitable number and/or type of desired radio communication protocols or standards, such as one or more Short Range mobile radio communication standards (e.g. Bluetooth, Zigbee, and the like); one or more Medium or Wide Range mobile radio communication standard (e.g. 3G (Universal Mobile Telecommunications System— UMTS), a 4G (Long Term Evolution—LTE), or a 5G mobile radio communication standard in accordance with corresponding 3GPP (3rd Generation Partnership Project) standards, the most recent version at the time of this writing being the 3GPP Release 16 (2020); one or more a Wireless Local Area Network communication protocols or standards (e.g. one or more technologies in accordance with IEEE 802.11 Working Group Standards) and/or one or more vehicle to everything (V2X) communication protocols).

The processing circuitry 803 may be configured to: perform alert/event clustering, road accident proneness (RAP) scoring determinations, and/or driver score determinations; analyze and/or process sensor data and received communications; analyze and/or process map data; generate and/or modify one or more maps; generate control data to control one or more vehicles 100 to perform one or more actions; analyze and/or process alert/event data corresponding to one or more vehicle-generated alerts/events; generate one or more alerts based on sensor data; imaging, video, and/or audio processing; object detection processing; and/or other processing as would be understood by one of ordinary skill in the art. The operations performed by the processing circuitry 803 may be in collaboration with operations performed by the vehicle(s) 100, such as to cooperatively perform one or more of the methods of the disclosure.

The processing circuitry 803 may include an alert processor 812 (as shown in FIG. 8B) that is configured to analyze and/or process alert/event data to determine road types of one or more roads based on the alert/event data. For example, the analysis of one or more alerts (from one or more vehicles 100) by the alert processor 812 of the controller 850 may be combined with low confidence map data (e.g. map metadata) to generate one or more higher-confidence maps. The improved/updated maps may then be provided to the vehicle(s) 100 via the transceiver 802.

As shown in FIG. 8B, the vehicle 100 may include controller 802, one or more transceivers 814, and one or more sensors 816. The controller 802 may be implemented at one or more of the processors 102 as shown in FIGS. 1-2. The transceiver(s) 814 may be implemented as one or more of the transceivers 208, 210, 212 as shown in FIG. 2. The sensor(s) 816 may be implemented as one or more of the sensors of the vehicle 100 as shown in FIGS. 1-2, such as image acquisition devices 104, radar sensors 110, LIDAR sensors 112, speed sensor 108, and/or other sensors of the vehicle 100.

The controller 802 may include one or image processors 804 configured to performing image processing on image data (e.g. from image acquisition devices 104); an object detector 806 configured to detect one or more objects based on sensor data (e.g. from sensors 104, 110, 112); mapping data processor 808 configured to process map data, generate one or more maps based on the map data, and/or modify one or more previously generated maps; an alert generator 810 configured to generate one or more alerts/events based on sensor data from one or more sensors of the vehicle 100 (e.g. from sensors 104, 108, 110, 112); and an alert processor 812.

The alert processor 812 may be configured to analyze or process one or more generated alerts/events and/or other alert/event data to identify the road type for unclassified roads and/or to improve the accuracy for previously classified roads. The alert processor 812 may compliment the video analytics to determine a road type. The output of the alert processor 812 can be combined with downloaded maps or map data (e.g. low confidence maps) to increase confidence in decisions dependent on road type. Advantageously, the alert processor 812 can improve metadata or other map data provided to one or more external devices (e.g. controller 850) and/or one or more other vehicles 100 to improve map generation.

Additionally or alternatively, the alert processor 812 (of the controller 802 and/or controller 850) may be configured to process one or more generated alerts, alert data, and/or other data using one or more machine learning models.

Figure 9:
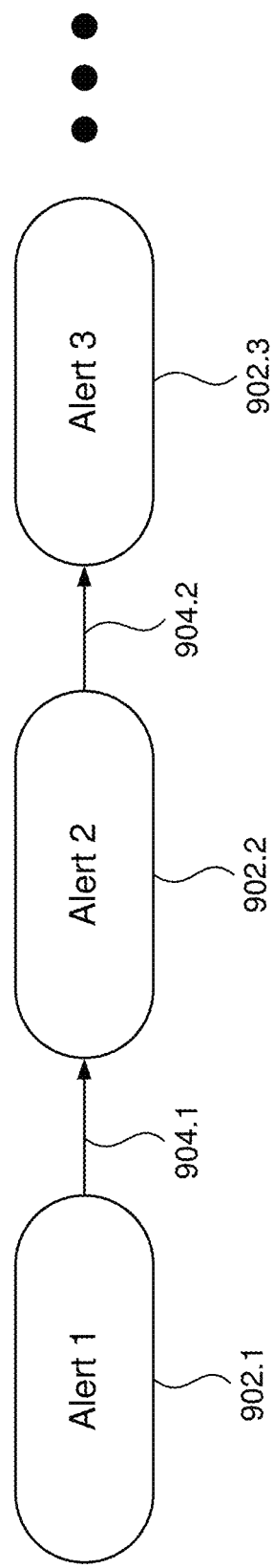
FIG. 9 illustrates an example graph structure in accordance with the present disclosure.

In an example, 41543 alerts/events that were generated over 1348 trips were analyzed with their location and time occurrence per trip across multiple vehicles. The information of each trip was modelled as a graph structure. FIG. 9 illustrates an example structure of the graph. In the graph structure, each node 902 of the graph represents the alert raised. According to the disclosure, the nodes 902 may be time ordered to maintain their temporal occurrence. According to the disclosure, to account for the spatial occurrence of the alerts over the duration of the trip, the edges 904 between the nodes 902 may be weighted. For example, the edges 904 may be weighted according to the following equation:

$$\text{weight factor} = \frac{1}{\text{distance}}$$

where the distance is the distance between the respective nodes 902 (the distance traveled between adjacent alerts).

The nodes 902 may be labelled with the road type at which the corresponding alert was raised. The road type used to label the nodes 902 may be obtained using, for example, reverse geocoding of the location coordinates using one or more conventional geocoding systems (e.g. OpenCage), or other techniques as would be understood by on of ordinary skill in the arts.

The different road type may include (but are not limited to) one or more of the following road types:

Trunk roads are the most important roads in a country's system that are not motorways (Need not necessarily be a divided highway).

Primary: The next most important roads in a country after trunk (Often link larger towns).

Secondary: The next most important roads in a country after primary (Often link towns).

Tertiary: The next most important roads in a country after secondary (Often link smaller towns and villages).

Motorway: A restricted access major divided highway, normally with 2 or more running lanes plus emergency hard shoulder.

Residential: Roads which serve as an access to housing, without function of connecting settlements.

Construction: Roads under construction.

Living Street: For living streets, which are residential streets where pedestrians have legal priority over cars, speeds are kept very low and where children are allowed to play on the street.

Proposed: For roads still under planning.

Rest area: Place where drivers can leave the road to rest, but not refuel.

Figure 10:
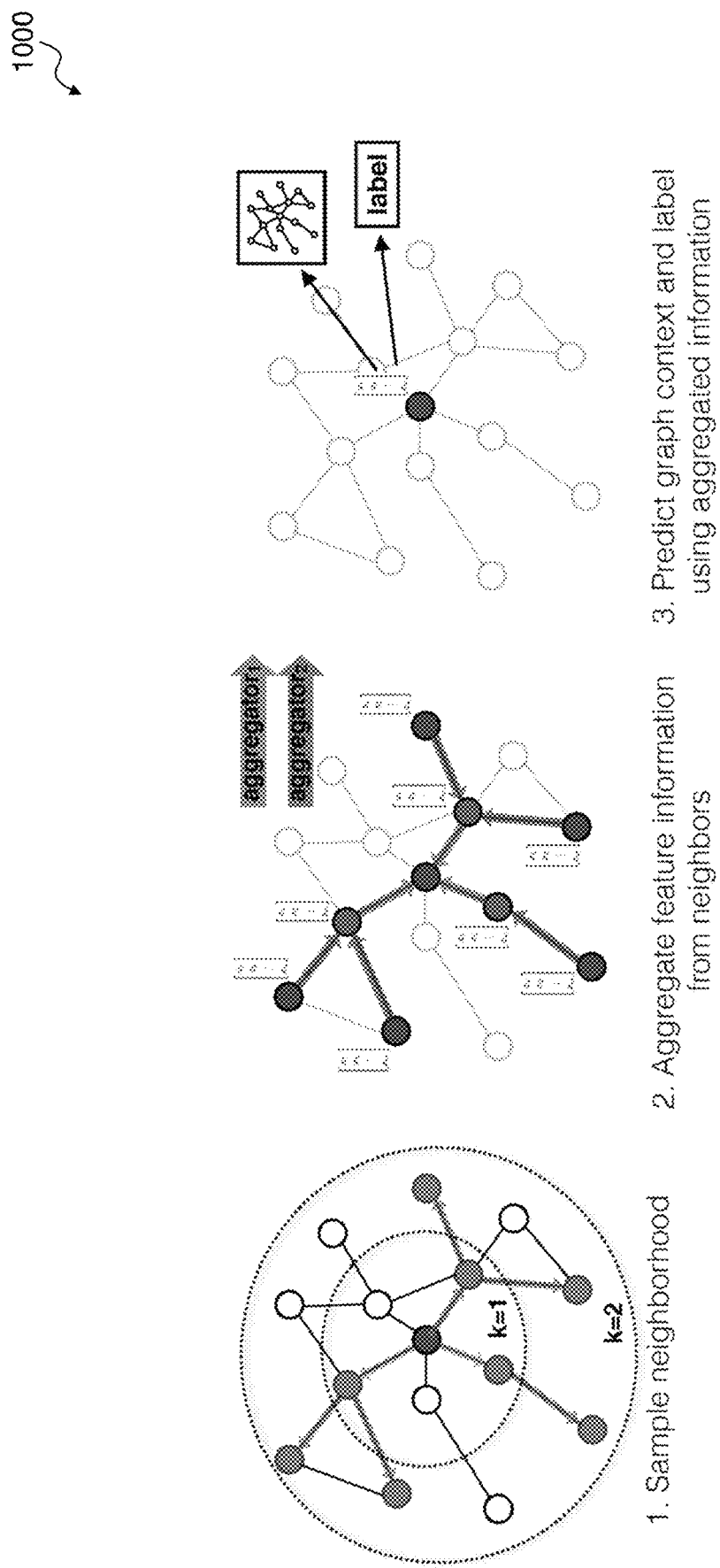
FIG. 10 illustrates an example inductive representation learning on large graphs process in accordance with the present disclosure.

According to the disclosure, a road-type classification model may be built using inductive representation learning on large graphs, or other machine-learning techniques as would be understood by one or ordinary skill in the arts. FIG. 10 illustrates an example inductive representation learning on large graphs algorithm. The inductive representation learning on large graphs algorithm may generate low-dimensional vector representations for nodes. Low-dimensional vector embeddings of nodes in large graphs have numerous applications in machine learning (e.g., node classification, clustering, link prediction). Advantageously, the inductive framework leverages node attribute information to efficiently generate representations on previously unseen data.

According to the disclosure, the road-type classification model may be trained by constructing a graph for each trip (e.g. as shown in FIG. 9). In an example training using the 41543 alerts, the following considerations were used. However, the disclosure is not limited thereto.

The nodes of the graph were split into 15000 nodes for training, 15000 nodes for validation and the remaining 11543 nodes for testing.

Two parameters: the batch_size (100) to use for training and the number of nodes to sample at each level of the model. In an exemplar, a two-layer model may be used with 50 nodes sampled in the first layer, and 2 in the second.

a 256-dimensional hidden node features at the first layer and 64-dimensional hidden node features at the second layer.

In this example, the road-type classification model advantageously produced a test accuracy of at least 90% with the example data set, which will increase with the accumulation of more trip data.

EXAMPLES

The following examples pertain to various techniques of the present disclosure.

An example (e.g. example 1) relates to a controller for a vehicle, comprising: a communication interface configured to receive alert data; and processing circuitry configured to: determine a road accident proneness (RAP) score based the alert data; and determine a driver score based on the determined RAP score.

Another example (e.g. example 2) relates to a previously-described example (e.g. example 1), wherein the processing circuitry is configured to determine the driver score based on the RAP score and an average RAP score.

Another example (e.g. example 3) relates to a previously-described example (e.g. example 2), wherein the average RAP score is determined based on alerts of a plurality of previously completed routes.

Another example (e.g. example 4) relates to a previously-described example (e.g. example 3), wherein the RAP score is associated with a driven route performed after the plurality of previously completed routes.

Another example (e.g. example 5) relates to a previously-described example (e.g. one or more of examples 2-4), wherein the average RAP score is based on alerts from previously driven routes.

Another example (e.g. example 6) relates to a previously-described example (e.g. one or more of examples 1-5), wherein the processing circuitry is further configured to perform cluster processing on the alerts from the previously driven routes to determine a plurality of alert clusters.

Another example (e.g. example 7) relates to a previously-described example (e.g. example 6), wherein the processing circuitry is further configured to determine one or more alert clusters of the plurality of alert clusters based on the alert data, the determined one or more alert clusters being traversed by the vehicle on a driven route, wherein the RAP score is associated with the driven route.

Another example (e.g. example 8) relates to a previously-described example (e.g. one or more of examples 1-7), wherein the processing circuitry is further configured to weight the alert data based on a weighting factor.

Another example (e.g. example 9) relates to a previously-described example (e.g. one or more of examples 1-8), wherein the alert data corresponds to one or more alerts generated by a Fleet Management System (FMS) and/or Collision Avoidance System (CAS) associated with the vehicle.

Another example (e.g. example 10) relates to a previously-described example (e.g. one or more of examples 1-9), wherein the alert data is generated based on an acceleration event, a velocity event, a braking event, a directional-change event, a distracted-driver event, an impaired-driver event, and/or a collision-avoidance event.

Another example (e.g. example 11) relates to a previously-described example (e.g. one or more of examples 1-10), wherein the alert data is generated based on data from a sensor of the vehicle and/or a sensor within or attached to the vehicle that is communicatively coupled to the controller.

Another example (e.g. example 12) relates to a previously-described example (e.g. one or more of examples 1-11), wherein the processing circuitry is further configured to: perform cluster processing on alerts from previously driven routes to generate a plurality of alert clusters; determine one or more alert clusters of the plurality of alert clusters based on the alert data; determine a respective RAP score for each of the one or more alert clusters; and determine an average RAP score based on the plurality of alert clusters, wherein the driver score is determined based on the RAP score for each of the one or more alert clusters and the average RAP score.

Another example (e.g. example 13) relates to a previously-described example (e.g. example 12), wherein the processing circuitry is further configured to: normalize the plurality of alert clusters based on a number of respective trips traversed through each of the plurality of alert clusters; and normalize the average RAP score and each of the respective RAP scores based on a proportion of alerts within each of the respective one or more alert clusters and a total number of alerts identified in the alert data.

Another example (e.g. example 14) relates to a previously-described example (e.g. one or more of examples 1-13), wherein the processing circuitry is further configured to determine a road type of a traversed road based on the alert data.

An example (e.g. example 15) relates to a controller for a vehicle, comprising: a communication interface configured to receive alert data; and processing circuitry configured to determine a road type of a traversed road based on alerts generated during traversal of the road, the alerts being associated with the received alert data.

Another example (e.g. example 16) relates to a previously-described example (e.g. example 15), wherein the processing circuitry is further configured to update map data based on the determined road type.

Another example (e.g. example 17) relates to a previously-described example (e.g. one or more of examples 15-16), wherein the processing circuitry is configured to control the vehicle to provide the determined road type to an external device to cause the external device to update map data based on the determined road type.

Another example (e.g. example 18) relates to a previously-described example (e.g. one or more of examples 15-17), wherein the processing circuitry is configured to determine the road type using a road-type classification model.

Another example (e.g. example 19) relates to a previously-described example (e.g. example 18), wherein the road-type classification model is based on inductive representation learning on large graphs.

Another example (e.g. example 20) relates to a previously-described example (e.g. one or more of examples 18-19), wherein the road-type classification model is a machine learning model.

An example (e.g. example 21) relates to a controller for a vehicle, comprising: interface means for receiving alert data; and processing means for: determining a road accident proneness (RAP) score based the alert data; and determining a driver score based on the determined RAP score.

Another example (e.g. example 22) relates to a previously-described example (e.g. example 21), wherein the processing means is further configured to: perform cluster processing on alerts from previously driven routes to generate a plurality of alert clusters; determine one or more alert clusters of the plurality of alert clusters based on the alert data; determine a respective RAP score for each of the one or more alert clusters; and determine an average RAP score based on the plurality of alert clusters, wherein the driver score is determined based on the RAP score for each of the one or more alert clusters and the average RAP score.

Another example (e.g. example 23) relates to a previously-described example (e.g. example 22), wherein the processing means is further configured to: normalize the plurality of alert clusters based on a number of respective trips traversed through each of the plurality of alert clusters; and normalize the average RAP score and each of the respective RAP scores based on a proportion of alerts within each of the respective one or more alert clusters and a total number of alerts identified in the alert data.

Another example (e.g. example 24) relates to a previously-described example (e.g. one or more of examples 22-23), wherein the processing means is further configured to: weight the alerts from the previously driven routes, the average RAP score being based on the weighted alerts from the previously driven routes; and weight alerts of the one or more alert clusters of the plurality of alert clusters, the respective RAP score for each of the one or more alert clusters being based on the weighted alerts of the one or more alert clusters.

Another example (e.g. example 25) relates to a previously-described example (e.g. one or more of examples 21-24), wherein the processing means is further configured to determine a road type of a traversed road based on the alert data.

An example (e.g. example 26) relates to a controller for a vehicle, comprising: a interface means for receiving alert data; and processing means for: determining a road accident proneness (RAP) score based the alert data; and determining a driver score based on the determined RAP score.

Another example (e.g. example 27) relates to a previously-described example (e.g. example 26), wherein the processing means is configured to determine the driver score based on the RAP score and an average RAP score.

Another example (e.g. example 28) relates to a previously-described example (e.g. example 27), wherein the average RAP score is determined based on alerts of a plurality of previously completed routes.

Another example (e.g. example 29) relates to a previously-described example (e.g. example 28), wherein the RAP score is associated with a driven route performed after the plurality of previously completed routes.

Another example (e.g. example 30) relates to a previously-described example (e.g. one or more of examples 27-29), wherein the average RAP score is based on alerts from previously driven routes.

Another example (e.g. example 31) relates to a previously-described example (e.g. one or more of examples 26-30), wherein the processing means is further configured to perform cluster processing on the alerts from the previously driven routes to determine a plurality of alert clusters.

Another example (e.g. example 32) relates to a previously-described example (e.g. example 31), wherein the processing means is further configured to determine one or more alert clusters of the plurality of alert clusters based on the alert data, the determined one or more alert clusters being traversed by the vehicle on a driven route, wherein the RAP score is associated with the driven route.

Another example (e.g. example 33) relates to a previously-described example (e.g. one or more of examples 26-32), wherein the processing means is further configured to weight the alert data based on a weighting factor.

Another example (e.g. example 34) relates to a previously-described example (e.g. one or more of examples 26-33), wherein the alert data corresponds to one or more alerts generated by a Fleet Management System (FMS) and/or Collision Avoidance System (CAS) associated with the vehicle.

Another example (e.g. example 35) relates to a previously-described example (e.g. one or more of examples 26-34), wherein the alert data is generated based on an acceleration event, a velocity event, a braking event, a directional-change event, a distracted-driver event, an impaired-driver event, and/or a collision-avoidance event.

Another example (e.g. example 36) relates to a previously-described example (e.g. one or more of examples 26-35), wherein the alert data is generated based on data from a sensor of the vehicle and/or a sensor within or attached to the vehicle that is communicatively coupled to the controller.

Another example (e.g. example 37) relates to a previously-described example (e.g. one or more of examples 26-36), wherein the processing means is further configured to: perform cluster processing on alerts from previously driven routes to generate a plurality of alert clusters; determine one or more alert clusters of the plurality of alert clusters based on the alert data; determine a respective RAP score for each of the one or more alert clusters; and determine an average RAP score based on the plurality of alert clusters, wherein the driver score is determined based on the RAP score for each of the one or more alert clusters and the average RAP score.

Another example (e.g. example 38) relates to a previously-described example (e.g. example 37), wherein the processing means is further configured to: normalize the plurality of alert clusters based on a number of respective trips traversed through each of the plurality of alert clusters; and normalize the average RAP score and each of the respective RAP scores based on a proportion of alerts within each of the respective one or more alert clusters and a total number of alerts identified in the alert data.

Another example (e.g. example 39) relates to a previously-described example (e.g. one or more of examples 26-38), wherein the processing means is further configured to determine a road type of a traversed road based on the alert data.

An example (e.g. example 40) relates to a controller for a vehicle, comprising: a interface means for receiving alert data; and processing means for determining a road type of a traversed road based on alerts generated during traversal of the road, the alerts being associated with the received alert data.

Another example (e.g. example 41) relates to a previously-described example (e.g. example 40), wherein the processing means is further configured to update map data based on the determined road type.

Another example (e.g. example 42) relates to a previously-described example (e.g. one or more of examples 40-41), wherein the processing means is configured to control the vehicle to provide the determined road type to an external device to cause the external device to update map data based on the determined road type.

Another example (e.g. example 43) relates to a previously-described example (e.g. one or more of examples 40-42), wherein the processing means is configured to determine the road type using a road-type classification model.

Another example (e.g. example 44) relates to a previously-described example (e.g. example 43), wherein the road-type classification model is based on inductive representation learning on large graphs.

Another example (e.g. example 45) relates to a previously-described example (e.g. one or more of examples 43-44), wherein the road-type classification model is a machine learning model.

An example is related to a vehicle that includes the controller of a previously-described example (e.g. one or more of examples 1-45).

An example is related to a computing system that includes the controller of a previously-described example (e.g. one or more of examples 1-45).

An example is related to a system that includes one or more vehicles and a computing system, the one or more vehicles and the computing system each including the controller of a previously-described example (e.g. one or more of examples 1-45).

An apparatus as shown and described.

A method as shown and described.

Conclusion

The aforementioned description will so fully reveal the general nature of the implementation of the disclosure that others can, by applying knowledge within the skill of the art, readily modify and/or adapt for various applications such specific implementations without undue experimentation and without departing from the general concept of the present disclosure. Therefore, such adaptations and modifications are intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Each implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

The exemplary implementations described herein are provided for illustrative purposes, and are not limiting. Other implementations are possible, and modifications may be made to the exemplary implementations. Therefore, the specification is not meant to limit the disclosure. Rather, the scope of the disclosure is defined only in accordance with the following claims and their equivalents.

The designs of the disclosure may be implemented in hardware (e.g., circuits), firmware, software, or any combination thereof. Designs may also be implemented as instructions stored on a machine-readable medium, which may be read and executed by one or more processors. A machine-readable medium may include any mechanism for storing or transmitting information in a form readable by a machine (e.g., a computing device). A machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

Throughout the drawings, it should be noted that like reference numbers are used to depict the same or similar elements, features, and structures, unless otherwise noted.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The terms "group (of)", "set (of)", "collection (of)", "series (of)", "sequence (of)", "grouping (of)", etc., and the like in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The phrase "at least one of" with regard to a group of elements may be used herein to mean at least one element from the group consisting of the elements. The phrase "at least one of" with regard to a group of elements may be used herein to mean a selection of: one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned data types and may take various forms and represent any information as understood in the art.

The terms "processor," "processing circuitry," or "controller" as used herein may be understood as any kind of technological entity that allows handling of data. The data may be handled according to one or more specific functions executed by the processor, processing circuitry, or controller. Further, processing circuitry, a processor, or a controller as used herein may be understood as any kind of circuit, e.g., any kind of analog or digital circuit. Processing circuitry, a processor, or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as processing circuitry, a processor, controller, or logic circuit. It is understood that any two (or more) of the processors, controllers, logic circuits, or processing circuitries detailed herein may be realized as a single entity with equivalent functionality or the like, and conversely that any single processor, controller, logic circuit, or processing circuitry detailed herein may be realized as two (or more) separate entities with equivalent functionality or the like.

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

In one or more of the implementations described herein, processing circuitry can include memory that stores data and/or instructions. The memory can be any well-known volatile and/or non-volatile memory, including read-only memory (ROM), random access memory (RAM), flash memory, a magnetic storage media, an optical disc, erasable programmable read only memory (EPROM), and programmable read only memory (PROM). The memory can be non-removable, removable, or a combination of both.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). Processing circuitry, a processor, or a controller may transmit or receive data over a software-level connection with another processor, controller, or processing circuitry in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven object. A vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, and the like.

The term "autonomous vehicle" may describe a vehicle that implements all or substantially all navigational changes, at least during some (significant) part (spatial or temporal, e.g., in certain areas, or when ambient conditions are fair, or on highways, or above or below a certain speed) of some drives. Sometimes an "autonomous vehicle" is distinguished from a "partially autonomous vehicle" or a "semi-autonomous vehicle" to indicate that the vehicle is capable of implementing some (but not all) navigational changes, possibly at certain times, under certain conditions, or in certain areas. A navigational change may describe or include a change in one or more of steering, braking, or acceleration/deceleration of the vehicle. A vehicle may be described as autonomous even in case the vehicle is not fully automatic (fully operational with driver or without driver input). Autonomous vehicles may include those vehicles that can operate under driver control during certain time periods and without driver control during other time periods. Autonomous vehicles may also include vehicles that control only some implementations of vehicle navigation, such as steering (e.g., to maintain a vehicle course between vehicle lane constraints) or some steering operations under certain circumstances (but not under all circumstances), but may leave other implementations of vehicle navigation to the driver (e.g., braking or braking under certain circumstances). Autonomous vehicles may also include vehicles that share the control of one or more implementations of vehicle navigation under certain circumstances (e.g., hands-on, such as responsive to a driver input) and vehicles that control one or more implementations of vehicle navigation under certain circumstances (e.g., hands-off, such as independent of driver input). Autonomous vehicles may also include vehicles that control one or more implementations of vehicle navigation under certain circumstances, such as under certain environmental conditions (e.g., spatial areas, roadway conditions). In some implementations, autonomous vehicles may handle some or all implementations of braking, speed control, velocity control, and/or steering of the vehicle. An autonomous vehicle may include those vehicles that can operate without a driver. The level of autonomy of a vehicle may be described or determined by the Society of Automotive Engineers (SAE) level of the vehicle (as defined by the SAE in SAE J30162018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

The systems and methods of the disclosure may utilize one or more machine learning models to perform corresponding functions of the vehicle (or other functions described herein). The term "model" as, for example, used herein may be understood as any kind of algorithm, which provides output data from input data (e.g., any kind of algorithm generating or calculating output data from input data). A machine learning model may be executed by a computing system to progressively improve performance of a specific task. In some aspects, parameters of a machine learning model may be adjusted during a training phase based on training data. A trained machine learning model may then be used during an inference phase to make predictions or decisions based on input data.

The machine learning models described herein may take any suitable form or utilize any suitable techniques. For example, any of the machine learning models may utilize supervised learning, semi-supervised learning, unsupervised learning, or reinforcement learning techniques.

In supervised learning, the model may be built using a training set of data that contains both the inputs and corresponding desired outputs. Each training instance may include one or more inputs and a desired output. Training may include iterating through training instances and using an objective function to teach the model to predict the output for new inputs. In semi-supervised learning, a portion of the inputs in the training set may be missing the desired outputs.

In unsupervised learning, the model may be built from a set of data which contains only inputs and no desired outputs. The unsupervised model may be used to find structure in the data (e.g., grouping or clustering of data points) by discovering patterns in the data. Techniques that may be implemented in an unsupervised learning model include, e.g., self-organizing maps, nearest-neighbor mapping, k-means clustering, and singular value decomposition.

Reinforcement learning models may be given positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

The systems and methods of the disclosure may utilize one or more classification models. In a classification model, the outputs may be restricted to a limited set of values (e.g., one or more classes). The classification model may output a class for an input set of one or more input values. An input set may include road condition data, event data, sensor data, such as image data, radar data, LIDAR data and the like, and/or other data as would be understood by one of ordinary skill in the art. A classification model as described herein may, for example, classify certain driving conditions and/or environmental conditions, such as weather conditions, road conditions, and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

One or more regression models may be used. A regression model may output a numerical value from a continuous range based on an input set of one or more values. References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward-thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

As described herein, the following terms may be used as synonyms: driving parameter set, driving model parameter set, safety layer parameter set, driver assistance, automated driving model parameter set, and/or the like (e.g., driving safety parameter set). These terms may correspond to groups of values used to implement one or more models for directing a vehicle to operate according to the manners described herein. Furthermore, throughout the present disclosure, the following terms may be used as synonyms: driving parameter, driving model parameter, safety layer parameter, driver assistance and/or automated driving model parameter, and/or the like (e.g., driving safety parameter), and may correspond to specific values within the previously described sets.

The invention claimed is:

1. A controller for a vehicle, comprising:
    a communication interface configured to receive alert data; and
    processing circuitry configured to:
        determine a road accident proneness (RAP) score based the alert data;
        perform cluster processing on alerts from previously driven routes to generate a plurality of alert clusters;
        determine one or more alert clusters of the plurality of alert clusters based on the alert data;
        determine a respective road accident proneness (RAP) score for each of the one or more alert clusters;
        determine an average RAP score based on the plurality of alert clusters, wherein a driver score is determined based on the RAP score for each of the one or more alert clusters and the average RAP score;
        determine the driver score based on the determined RAP score; and
        provide the determined driver score to a vehicle monitoring system.

2. The controller of claim 1, wherein the processing circuitry is configured to determine the driver score based on the RAP score and an average RAP score.

3. The controller of claim 2, wherein the average RAP score is determined based on alerts of a plurality of previously completed routes.

4. The controller of claim 3, wherein the RAP score is associated with a driven route performed after the plurality of previously completed routes.

5. The controller of claim 2, wherein the average RAP score is based on alerts from previously driven routes.

6. The controller of claim 5, wherein the processing circuitry is further configured to perform cluster processing on the alerts from the previously driven routes to determine a plurality of alert clusters.

7. The controller of claim 6, wherein the processing circuitry is further configured to determine one or more alert clusters of the plurality of alert clusters based on the alert data, the determined one or more alert clusters being traversed by the vehicle on a driven route, wherein the RAP score is associated with the driven route.

8. The controller of claim 1, wherein the processing circuitry is further configured to weight the alert data based on a weighting factor.

9. The controller of claim 1, wherein the alert data corresponds to one or more alerts generated by a Fleet Management System (FMS) and/or Collision Avoidance System (CAS) associated with the vehicle.

10. The controller of claim 1, wherein the alert data is generated based on an event selected form the group consisting of: an acceleration event, a velocity event, a braking event, a directional-change event, a distracted-driver event, an impaired-driver event, and a collision-avoidance event.

11. The controller of claim 1, wherein the alert data is generated based on data from a sensor of the vehicle and/or a sensor within or attached to the vehicle that is communicatively coupled to the controller.

12. The controller of claim 1, wherein the processing circuitry is further configured to:
    normalize the plurality of alert clusters based on a number of respective trips traversed through each of the plurality of alert clusters; and
    normalize the average RAP score and each of the respective RAP scores based on a proportion of alerts within each of the respective one or more alert clusters and a total number of alerts identified in the alert data.

13. The controller of claim 1, wherein the processing circuitry is further configured to determine a road type of a traversed road based on the alert data.

14. A controller for a vehicle, comprising:
    interface means for receiving alert data; and
    processing means for:
        determining a road accident proneness (RAP) score based the alert data;
        performing cluster processing on alerts from previously driven routes to generate a plurality of alert clusters;
        determining one or more alert clusters of the plurality of alert clusters based on the alert data;
        determining a respective RAP score for each of the one or more alert clusters; and
        determining an average RAP score based on the plurality of alert clusters, wherein a driver score is determined based on the RAP score for each of the one or more alert clusters and the average RAP score;
        determining the driver score based on the determined RAP score; and
        provide the determined driver score to a vehicle monitoring system.

15. The controller of claim 14, wherein the processing means is further configured to:
    normalize the plurality of alert clusters based on a number of respective trips traversed through each of the plurality of alert clusters; and
    normalize the average RAP score and each of the respective RAP scores based on a proportion of alerts within each of the respective one or more alert clusters and a total number of alerts identified in the alert data.

16. The controller of claim 14, wherein the processing means is further configured to:
    weight the alerts from the previously driven routes, the average RAP score being based on the weighted alerts from the previously driven routes; and
    weight alerts of the one or more alert clusters of the plurality of alert clusters, the respective RAP score for each of the one or more alert clusters being based on the weighted alerts of the one or more alert clusters.

17. The controller of claim 14, wherein the processing means is further configured to determine a road type of a traversed road based on the alert data.

* * * * *